(12) United States Patent
Otomaru et al.

(10) Patent No.: US 8,481,222 B2
(45) Date of Patent: Jul. 9, 2013

(54) FUEL CELL AND ELECTRONIC DEVICE INCLUDING THE FUEL CELL

(75) Inventors: Hidekazu Otomaru, Kagoshima (JP); Takayuki Miyao, Kagoshima (JP)

(73) Assignee: KYOCERA Corporation, Kyoto (JP)

(*) Notice: Subject to any disclaimer, the term of this patent is extended or adjusted under 35 U.S.C. 154(b) by 960 days.

(21) Appl. No.: 12/088,513

(22) PCT Filed: Sep. 29, 2006

(86) PCT No.: PCT/JP2006/319558
§ 371 (c)(1),
(2), (4) Date: Sep. 22, 2009

(87) PCT Pub. No.: WO2007/037420
PCT Pub. Date: Apr. 5, 2007

(65) Prior Publication Data
US 2010/0151344 A1 Jun. 17, 2010

(30) Foreign Application Priority Data

Sep. 30, 2005 (JP) ................... 2005-286306
Feb. 28, 2006 (JP) ................... 2006-053686
Mar. 31, 2006 (JP) ................... 2006-098737

(51) Int. Cl.
*H01M 8/04* (2006.01)

(52) U.S. Cl.
USPC ........................... 429/444; 429/512

(58) Field of Classification Search
USPC ................................... 429/444, 512
See application file for complete search history.

(56) References Cited

U.S. PATENT DOCUMENTS

| 6,465,119 | B1 | 10/2002 | Koripella et al. |
| 6,497,975 | B2 * | 12/2002 | Bostaph et al. ............. 429/415 |
| 2004/0142227 | A1 * | 7/2004 | Sugai et al. ................ 429/38 |
| 2005/0048344 | A1 | 3/2005 | Ishii |

FOREIGN PATENT DOCUMENTS

| JP | 2003-151592 | 5/2003 |
| JP | 2004-146080 | 5/2004 |
| JP | 2005-154207 | 6/2005 |

* cited by examiner

*Primary Examiner* — Karie O'Neill Apicella
(74) *Attorney, Agent, or Firm* — Procopio, Cory, Hargreaves & Savitch LLP

(57) ABSTRACT

According to a first aspect of the present invention, a fuel cell includes a base body, a flow channel and an electrolyte member. The base body includes a layered body of a plurality of insulating layers. The flow channel links grooves of the different insulating layers. The electrolyte member contacts with a portion of the flow channel.

19 Claims, 26 Drawing Sheets

FIG. 3
(a)
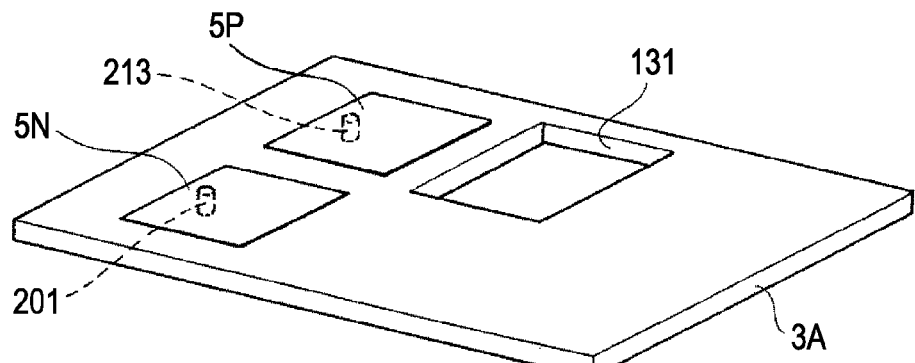
(b)
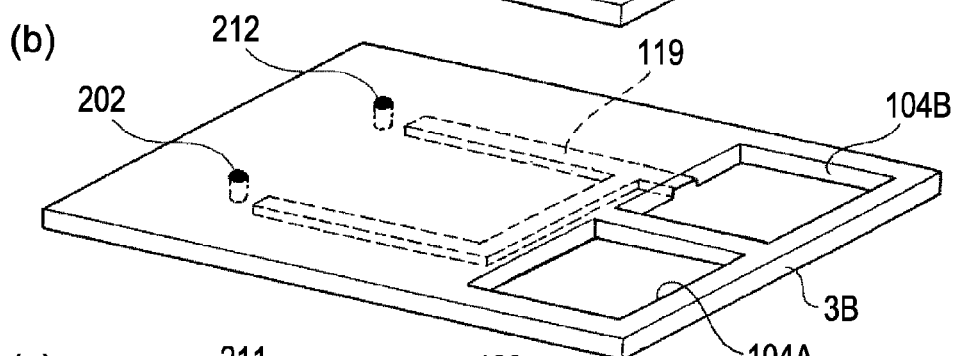
(c)
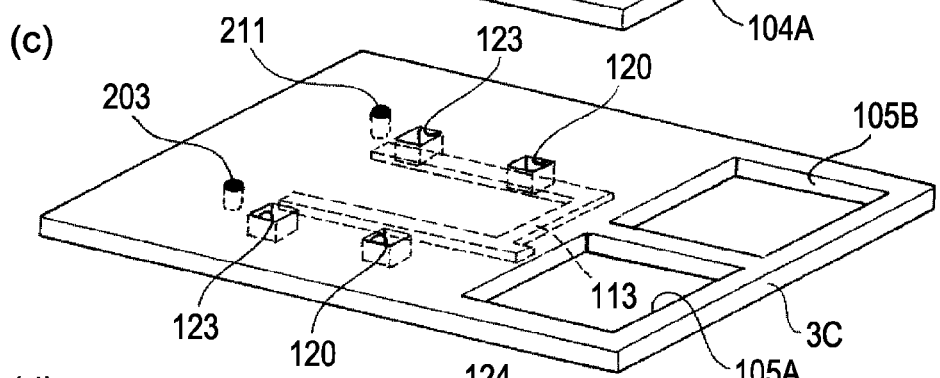
(d)
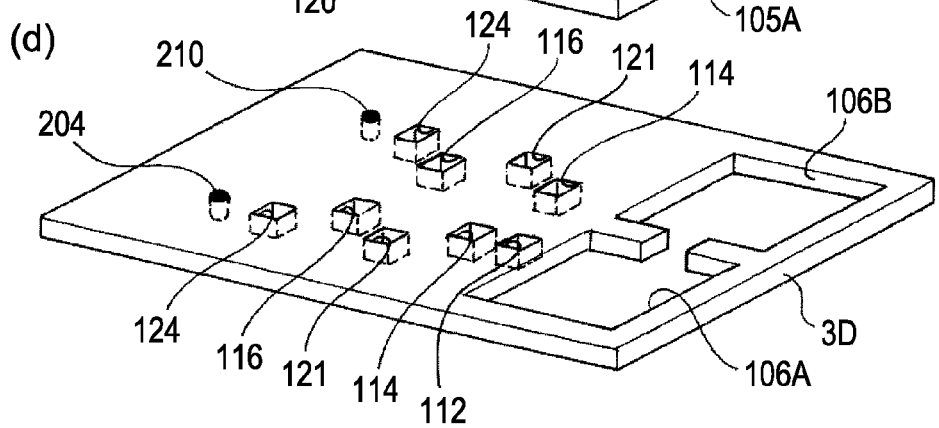

FIG. 4
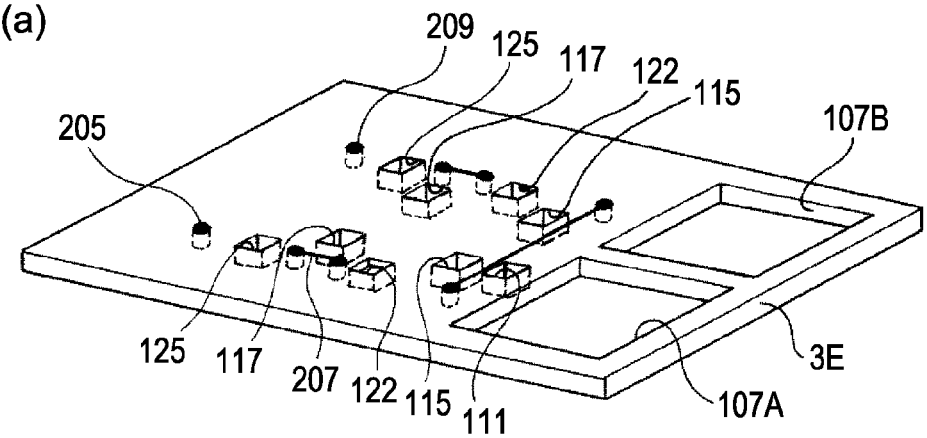
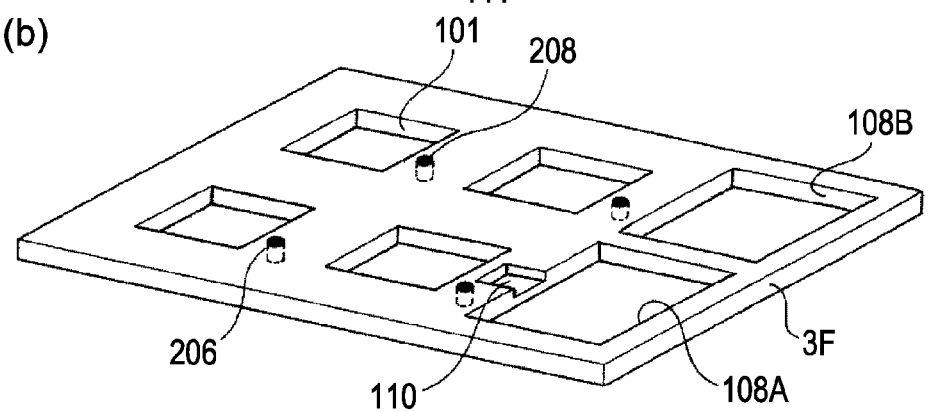
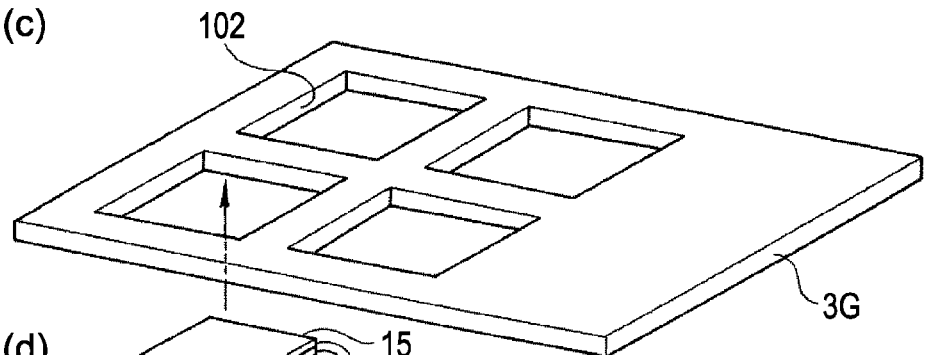
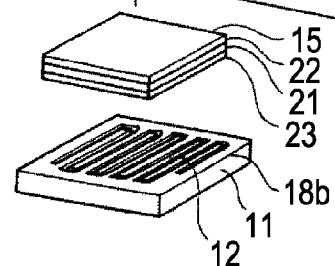

FIG. 6
(a)
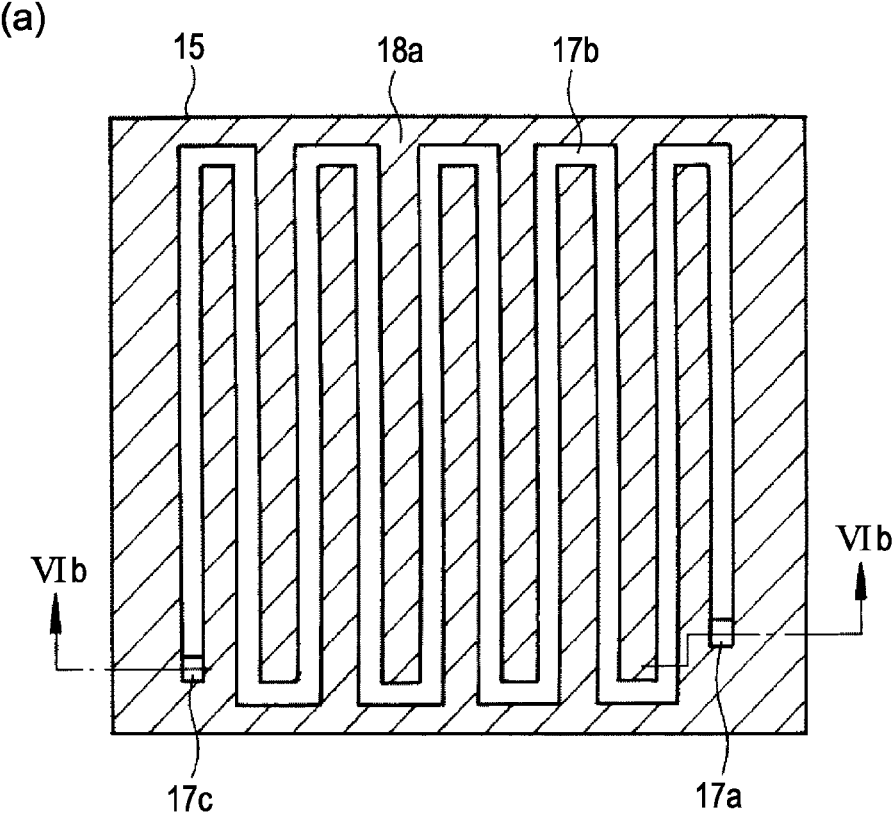
(b)
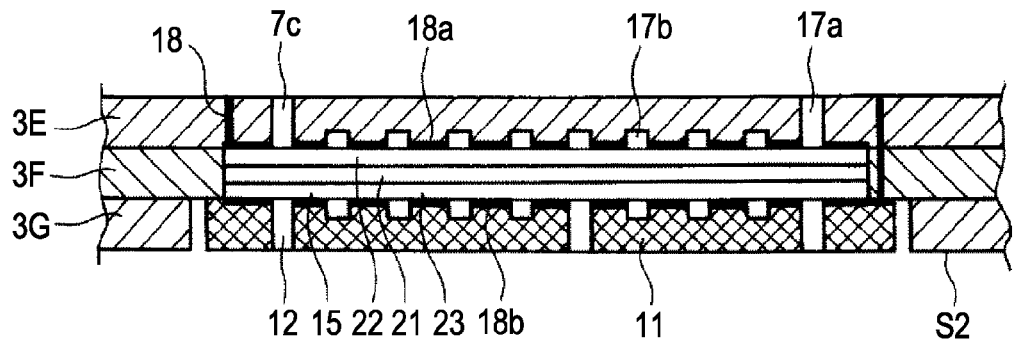

FIG. 8
(a)
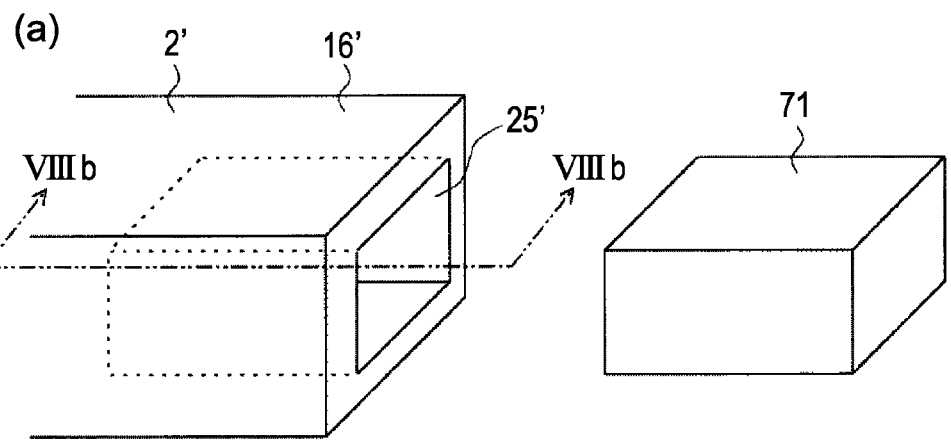
(b)
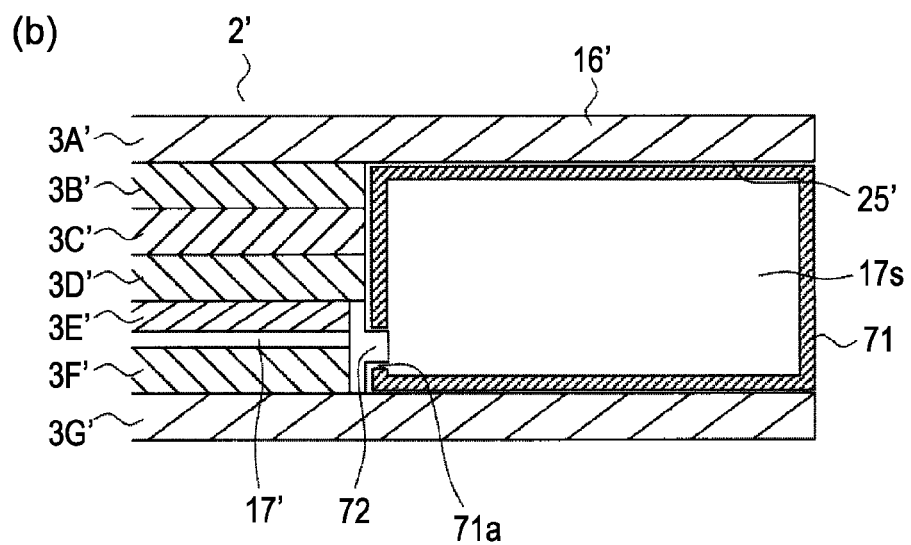
(c)
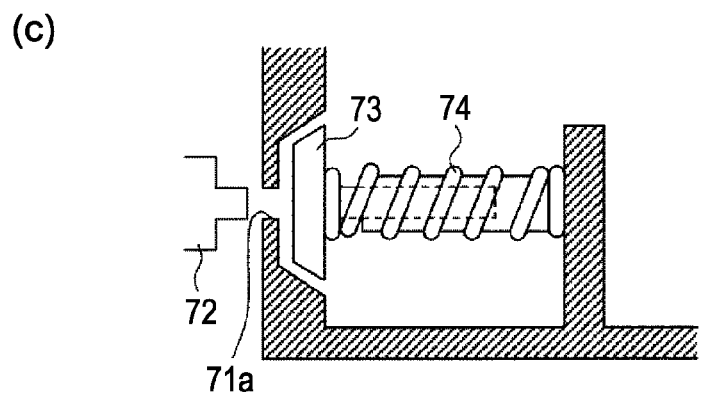

FIG. 13
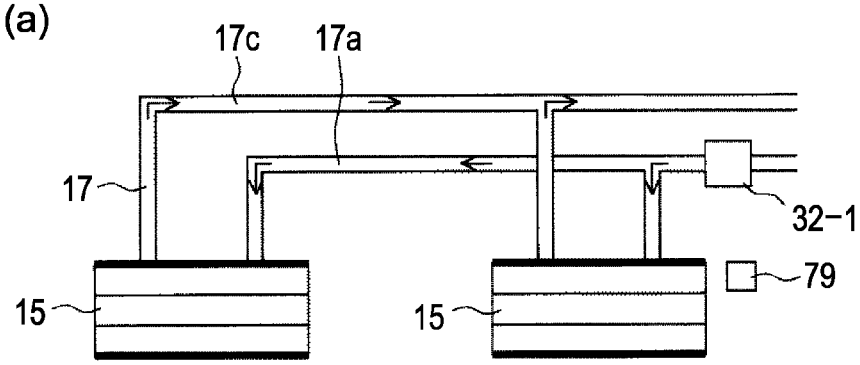
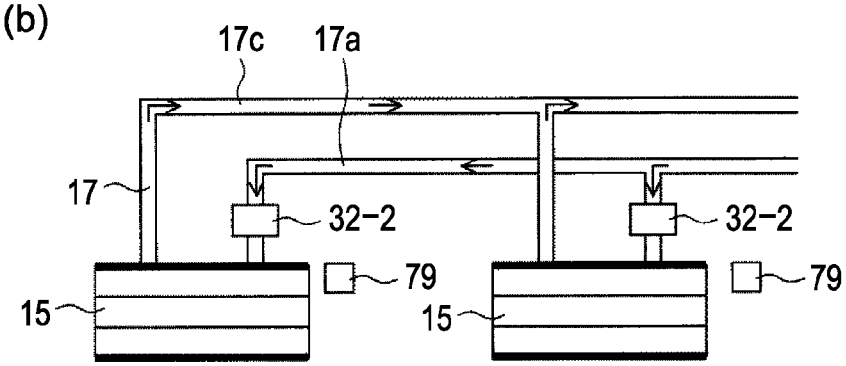
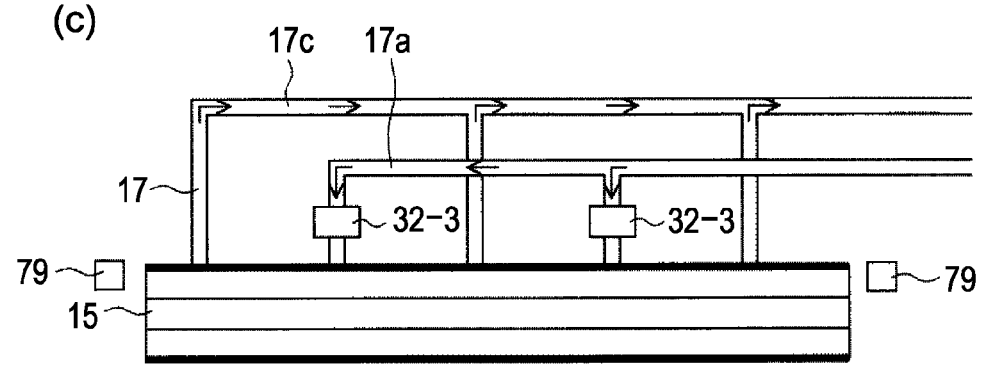

FIG. 14
(a)
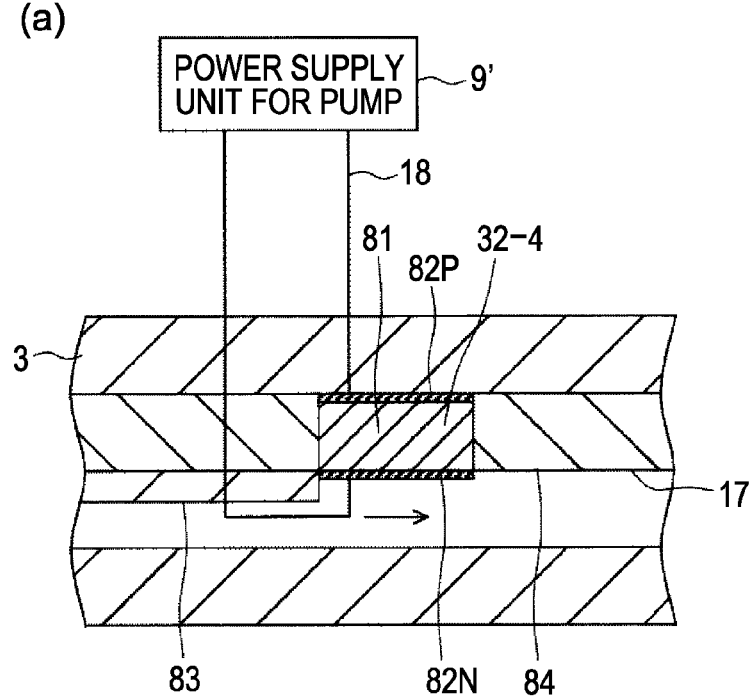
(b)
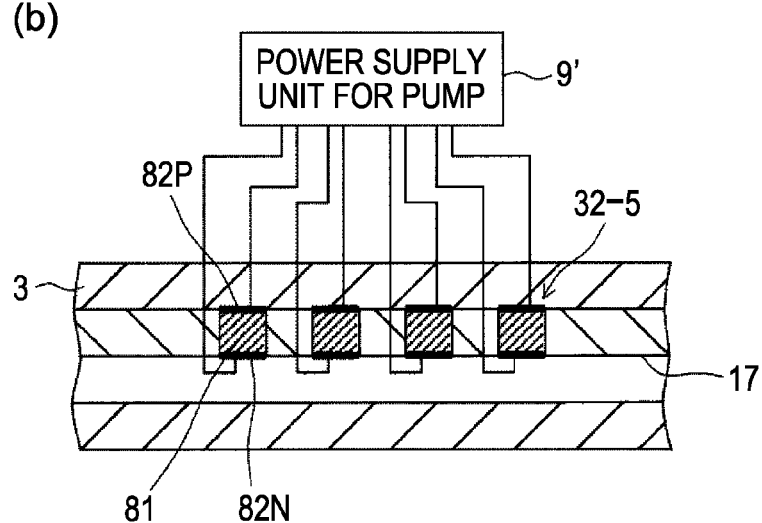

FIG. 16
(a)
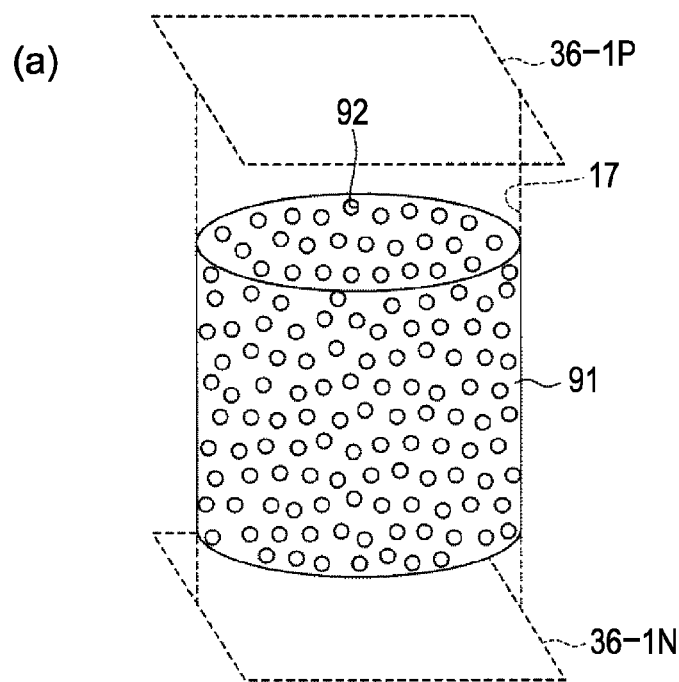
(b)
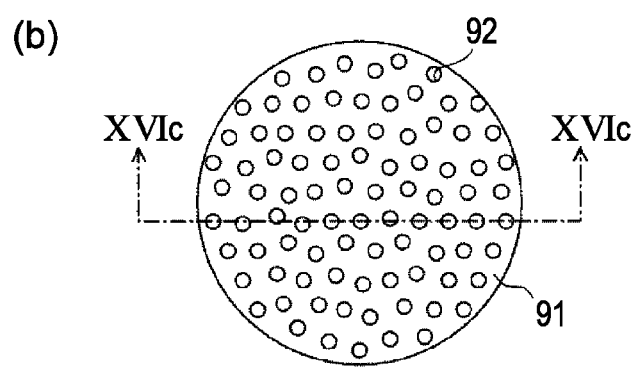
(c)
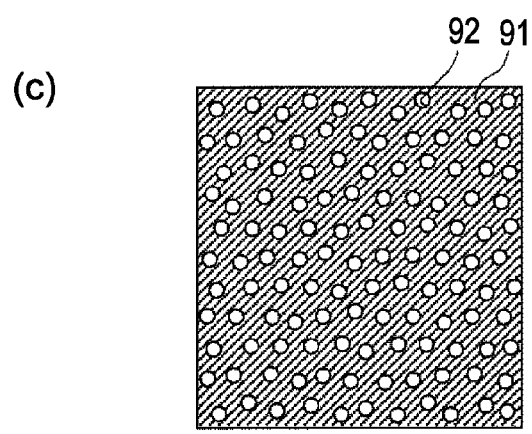

FIG. 17
(a)
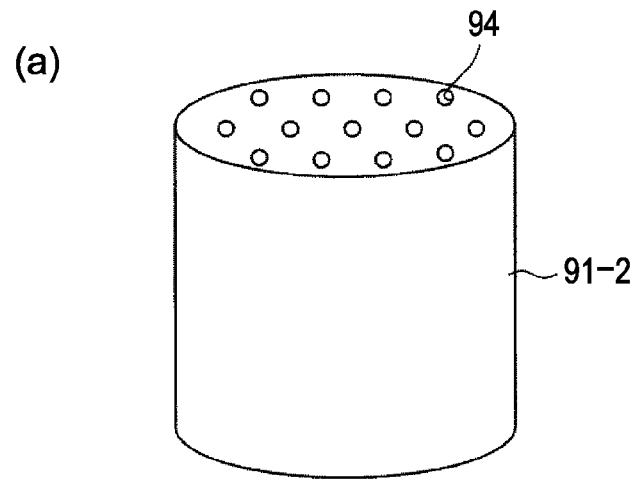
(b)
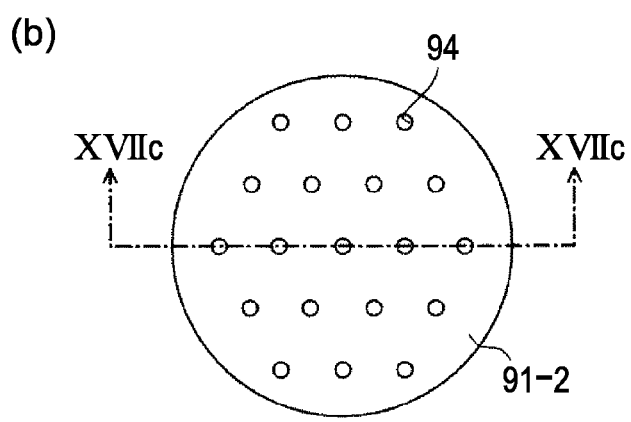
(c)
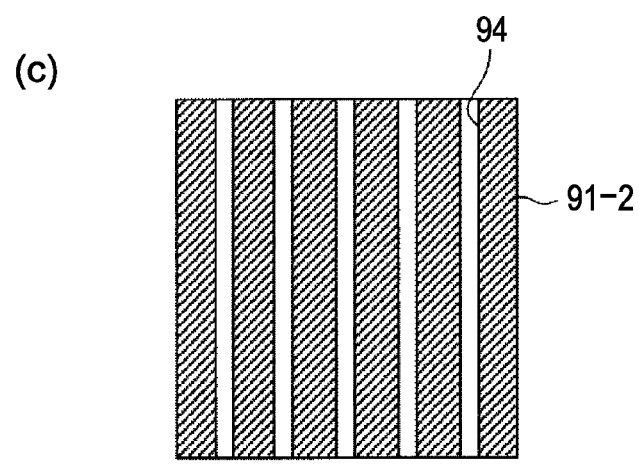

FIG. 18
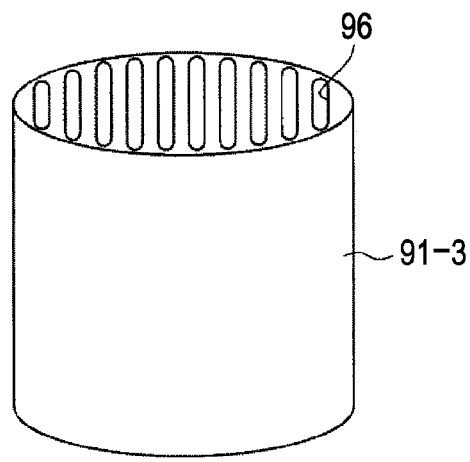
(a)
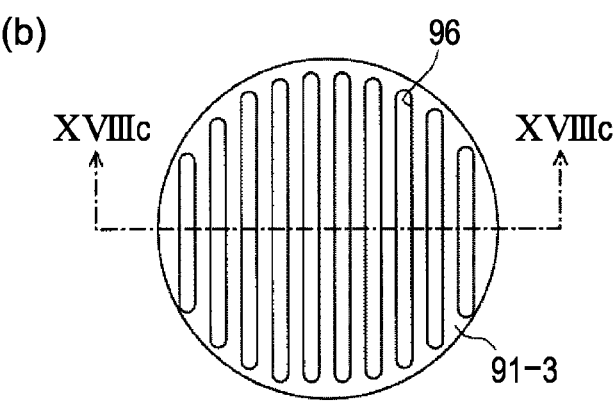
(b)
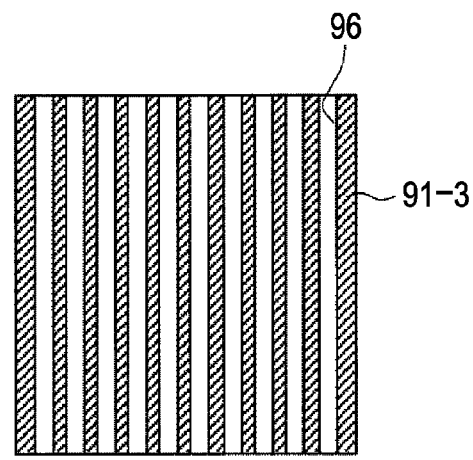
(c)

FIG. 19
(a)
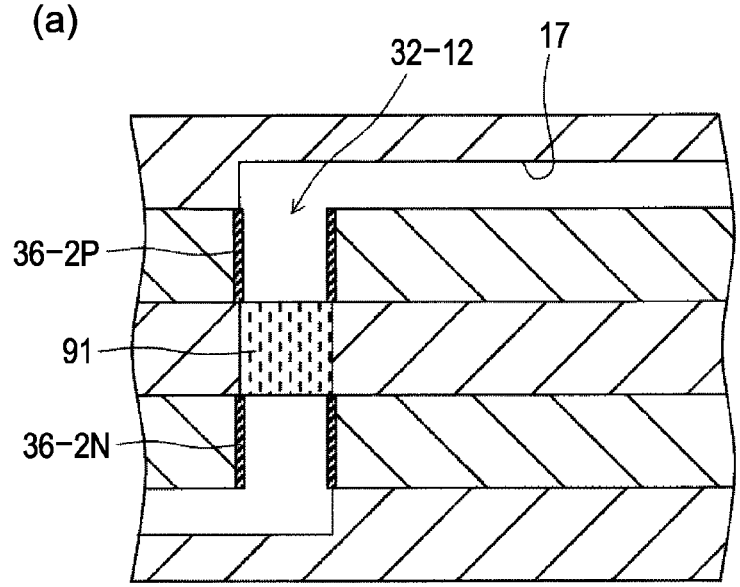
(b)
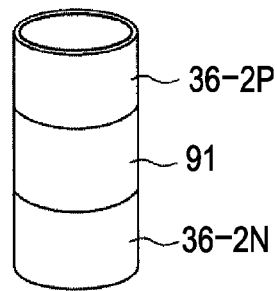

FIG. 20
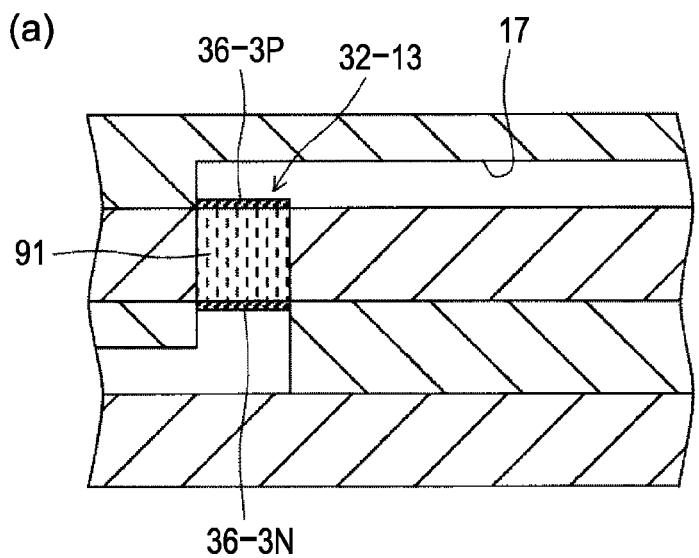
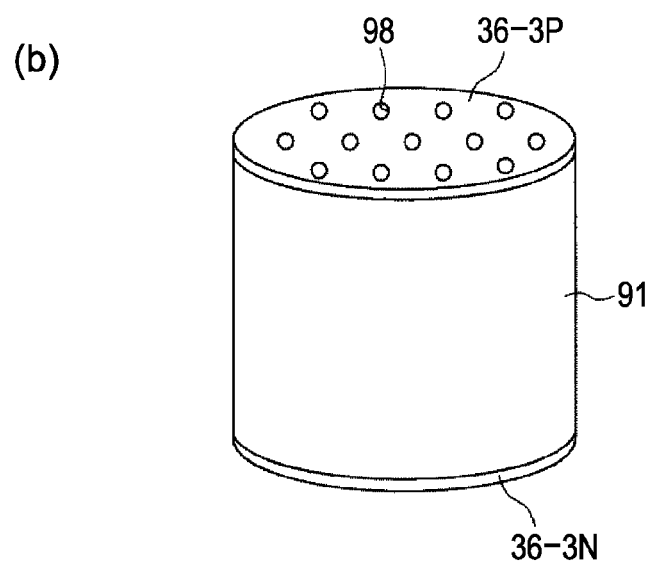

FIG. 22
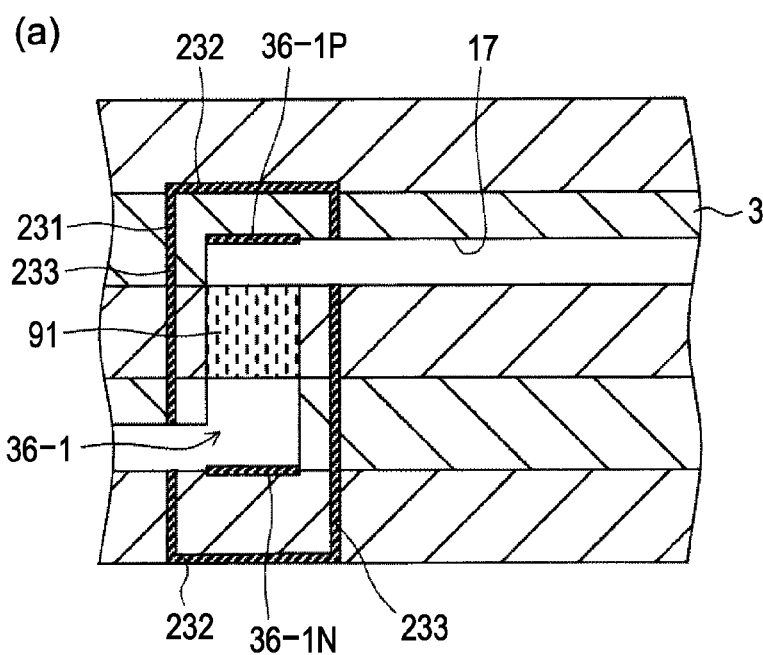
(a)
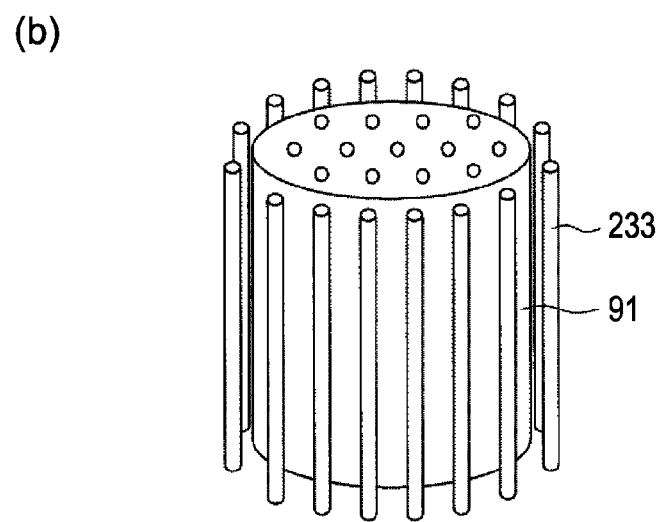
(b)

FIG. 23
(a)
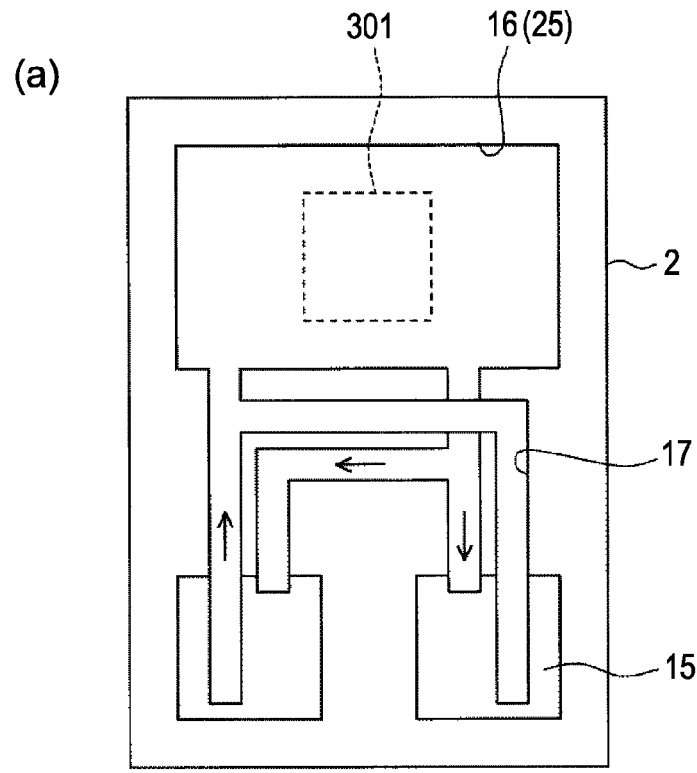
(b)
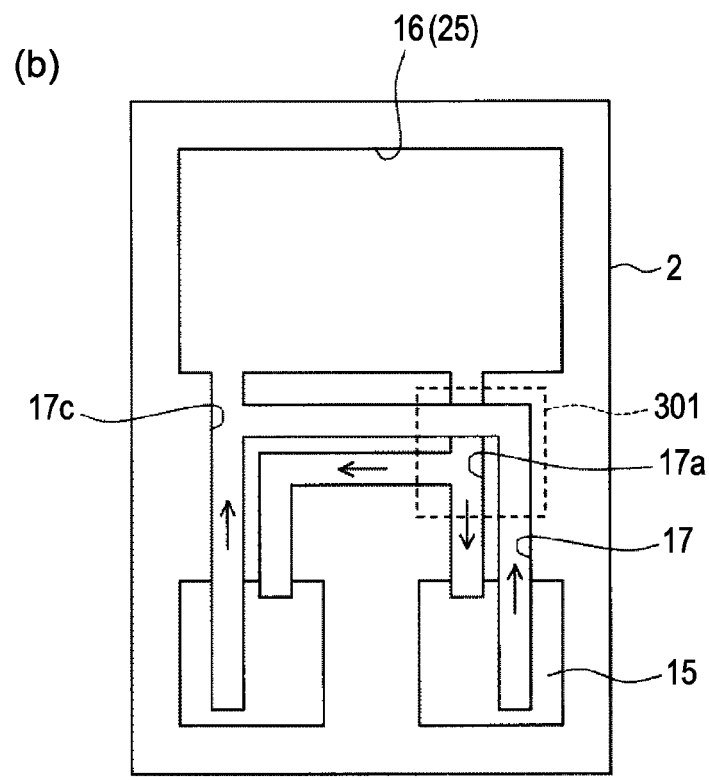

FIG. 24
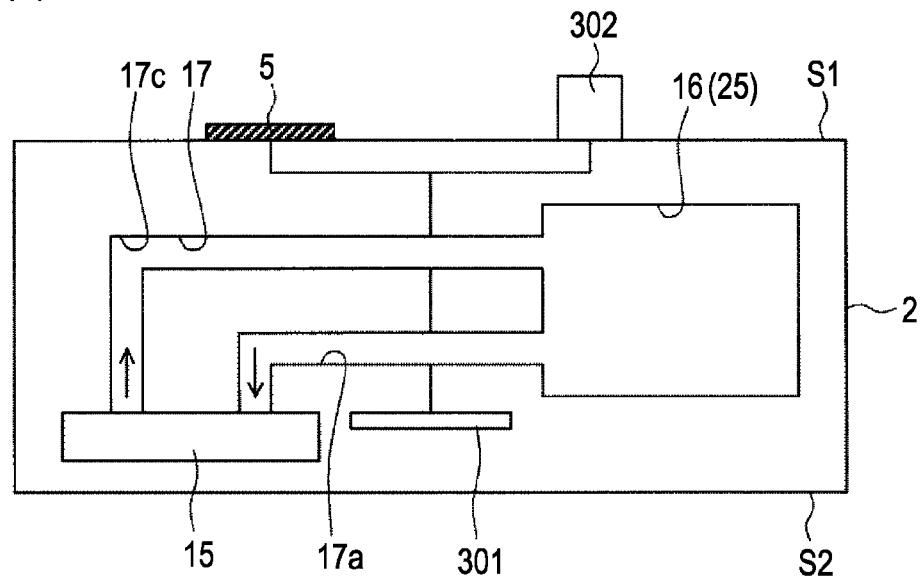
(a)
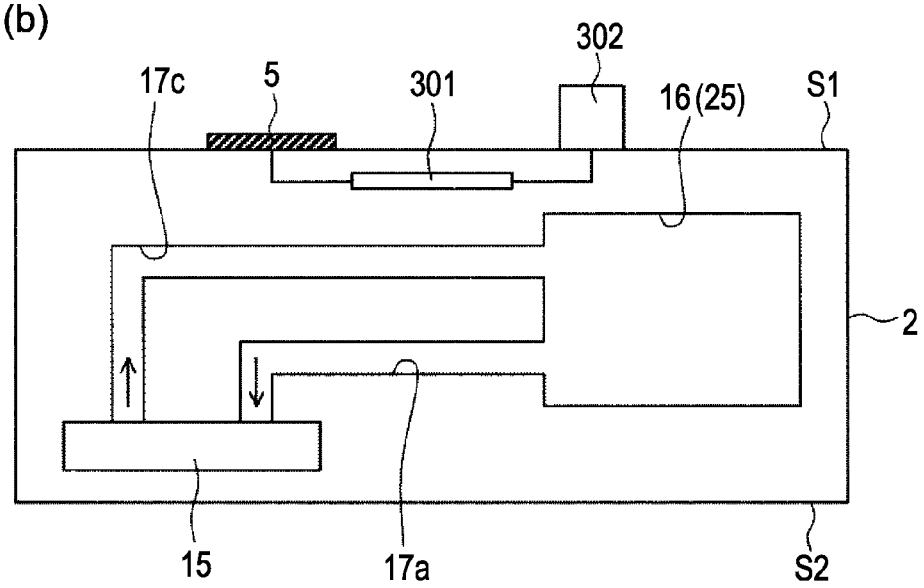
(b)

FIG. 25
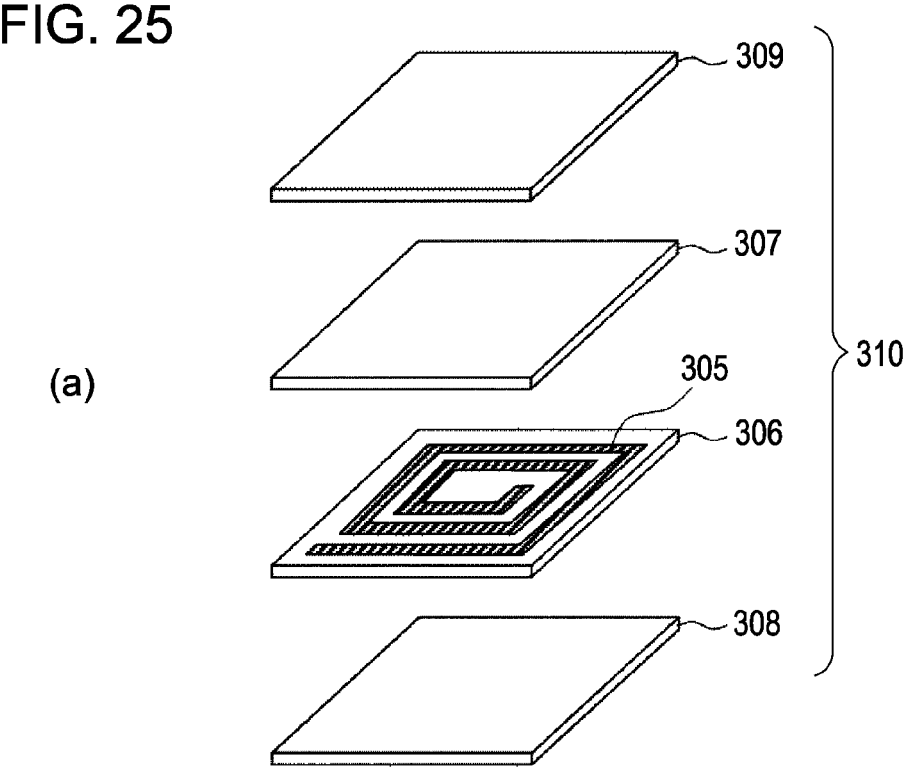
(a)
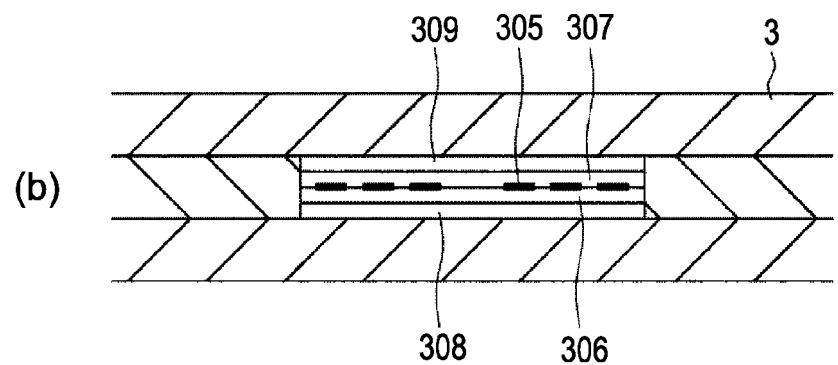
(b)
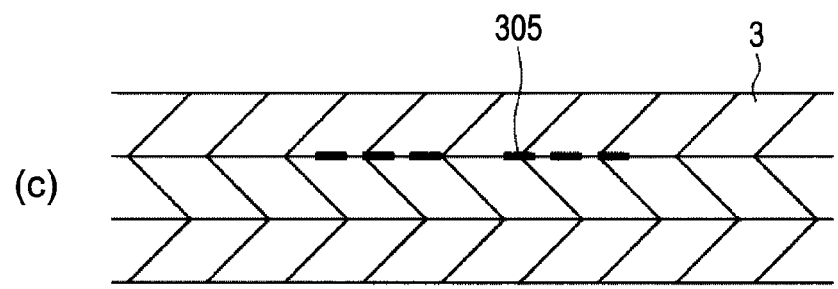
(c)

FIG. 26
(a)
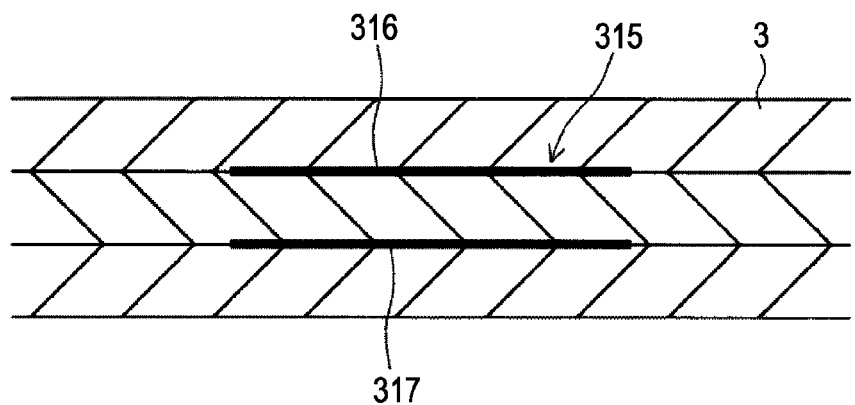
(b)
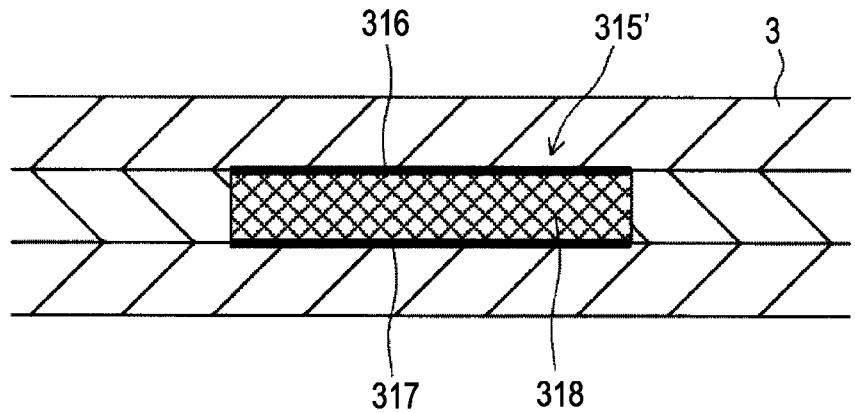

FUEL CELL AND ELECTRONIC DEVICE INCLUDING THE FUEL CELL

CROSS-REFERENCE TO RELATED APPLICATION

This application is the U.S. national stage application of international application serial number PCT/JP2006/319558, filed Sep. 29, 2006, which claims priority to Japanese patent application no. 2005-286306, filed Sep. 30, 2005, Japanese patent application no. 2006-053686, filed Feb. 28, 2006, and Japanese patent application no. 2006-098737, filed Mar. 31, 2006, each of which is incorporated herein by reference in its entirety.

FIELD OF THE INVENTION

Technical Field

The present invention relates to fuel cells and electronic devices including the fuel cells.

BACKGROUND OF THE INVENTION

Background Art

A fuel cell needs a flow channel therein to supply fuel or oxidation gas to an electrolyte member. Japanese Unexamined Patent Application Publication No. 2004-146080 discloses a fuel cell including a lid and a base body, both sandwiching an electrolyte member. The disclosed fuel cell includes grooves, which serve as a fuel flow channel, at a surface of the base body facing the electrolyte member.

SUMMARY OF INVENTION

Problems to be Solved by the Invention

However, when grooves are formed on the surface of the base body and grooves are linked to each other to serve as a plurality of flow channels, a plurality of the base bodies need to be laminated and need to use pipes which are arranged outside of the base body to connect a flow channel to another flow channel formed on the base bodies. Accordingly, the number of parts is increased and outer packaging becomes complex.

The present invention provides fuel cells that can increase the degree of freedom of arrangement of a flow channel that connects to the electrolyte, and electronic devices including the fuel cells.

Means for Solving the Problems

According to a first aspect of the present invention, a fuel cell includes a base body, a flow channel and an electrolyte member. The base body includes a layered body of a plurality of insulating layers. The flow channel links grooves of the different insulating layers. The electrolyte member contacts with a portion of the flow channel.

Preferably, the electrolyte member is sandwiched between the insulating layers.

Preferably, the base body includes a ceramic material.

Preferably, the flow channel includes a circulation channel inside the base body.

Preferably, the fuel flow channel branches off into a plurality of channels at the portion of the flow channel contacting with the electrolyte member.

Preferably, the grooves penetrate insulating layers in the thickness direction.

Preferably, the fuel cell further includes an output terminal on a surface of the base body outputting electric power and a conducting path in the base body electrically connecting the output terminal with the electrolyte member.

Preferably, the fuel cell further includes a feeding channel and a discharging channel. The feeding channel is placed upstream, relative to the direction of fuel flow, of the portion of the flow channel which contacts with the electrolyte member. The discharging channel is placed downstream, relative to the direction of fuel flow, of the part of the flow channel contacting with the electrolyte member. The discharging channel is closer to a surface of the base body than the feeding channel.

Preferably, the fuel cell further includes a feeding channel and a discharging channel. The feeding channel is placed at the upstream side in the direction to fuel flow of the portion of the flow channel which contacts with the electrolyte member. The discharging channel is placed at the downstream in the direction to fuel flow of the part of the flow channel contacting with the electrolyte member. At least the discharging channel is arranged along the feeding channel.

Preferably, the direction of fuel flowing through the discharging channel arranged along the feeding channel is opposite to the direction of fuel flowing through the feeding channel.

Preferably, the fuel cell further includes a concentration adjusting unit adjusting the concentration of fuel flowing through the circulation channel.

Preferably, the output terminal electrically connected to the electrolyte member is placed on a surface of the base body and the electrolyte member is placed closely to the other surface of the base body.

Preferably, the fuel cell further includes an antenna on or in the base body.

Preferably, the antenna overlaps the fuel flow channel in perspective plan view of the base body.

Preferably, the antenna is a part of interconnecting conductors formed in the base body.

Preferably, the flow channel arranged to overlap the antenna in perspective plan view of the base body is on the upstream side and the downstream side of the electrolyte member and the length between the upstream-side flow channel and the antenna is shorter than the length between the downstream-side flow channel and the antenna.

Preferably, the flow channel overlapping the antenna in perspective plan view of the base body constitutes at least part of a fuel storage unit for storing fuel.

According to a second aspect of the present invention, a fuel cell includes a base body, a flow channel and an electrolyte member. The flow channel links hollow portions in the base body, which penetrates the insulating layer in the thickness direction of the base body. The electrolyte member contacts with part of the flow channel.

According to a third aspect of the present invention, an electronic device includes an operation unit and a display unit on a housing, an operation control unit and a fuel cell. The operation control unit controls display content of the display unit based on input information from the operation unit. The fuel cell according to the first aspect of the present invention is contained in the housing and supplies electric power to the operation unit, the display unit, and the operation control unit.

Preferably, the electronic device further includes a reaction control unit which controls the supply of fuel or oxidation gas to the electrolyte member of the fuel cell in accordance with operation states of at least one of the display unit, the operation unit and operation control unit.

Advantages

According to the present invention, fuel cells can increase the degree of freedom of arrangement of a flow channel that connects to the electrolyte.

BRIEF DESCRIPTION OF DRAWINGS

FIG. 3 is an exploded perspective view of a base body of a fuel cell of FIG. 1.

FIG. 4 is an exploded perspective view of a base body of a fuel cell of FIG. 1.

FIG. 6 is a diagram showing a fuel flow channel near a cell main body of a fuel cell of FIG. 1.

FIG. 8 is a diagram showing a modification of a fuel storage unit of a fuel cell of FIG. 1.

FIG. 13 is a diagram showing an example of an arrangement position of a flow control unit.

FIG. 14 is a diagram showing an example of a flow control unit including a vibrator.

FIG. 16 is a diagram showing a linking member of an electroosmotic flow control unit of FIG. 15.

FIG. 17 is a diagram showing another example of a linking member of an electroosmotic flow control unit.

FIG. 18 is a diagram showing another example of a linking member of an electroosmotic flow control unit.

FIG. 19 is a diagram showing an arrangement example of electrodes of an electroosmotic flow control unit.

FIG. 20 is a diagram showing an arrangement example of electrodes of an electroosmotic flow control unit.

FIG. 22 is a diagram showing a shielding conductor for shielding electroosmotic flow control unit.

FIG. 23 is a perspective plan view of a fuel cell that conceptually shows an arrangement example of an electronic component.

FIG. 24 is a sectional view of a fuel cell that conceptually shows an arrangement example of an electronic component.

FIG. 25 is a diagram showing an example of an inductor, which is one example of an electronic component.

FIG. 26 is a diagram showing an example of a capacitor, which is one example of an electronic component.

DETAILED DESCRIPTION OF THE INVENTION

Figure 1:
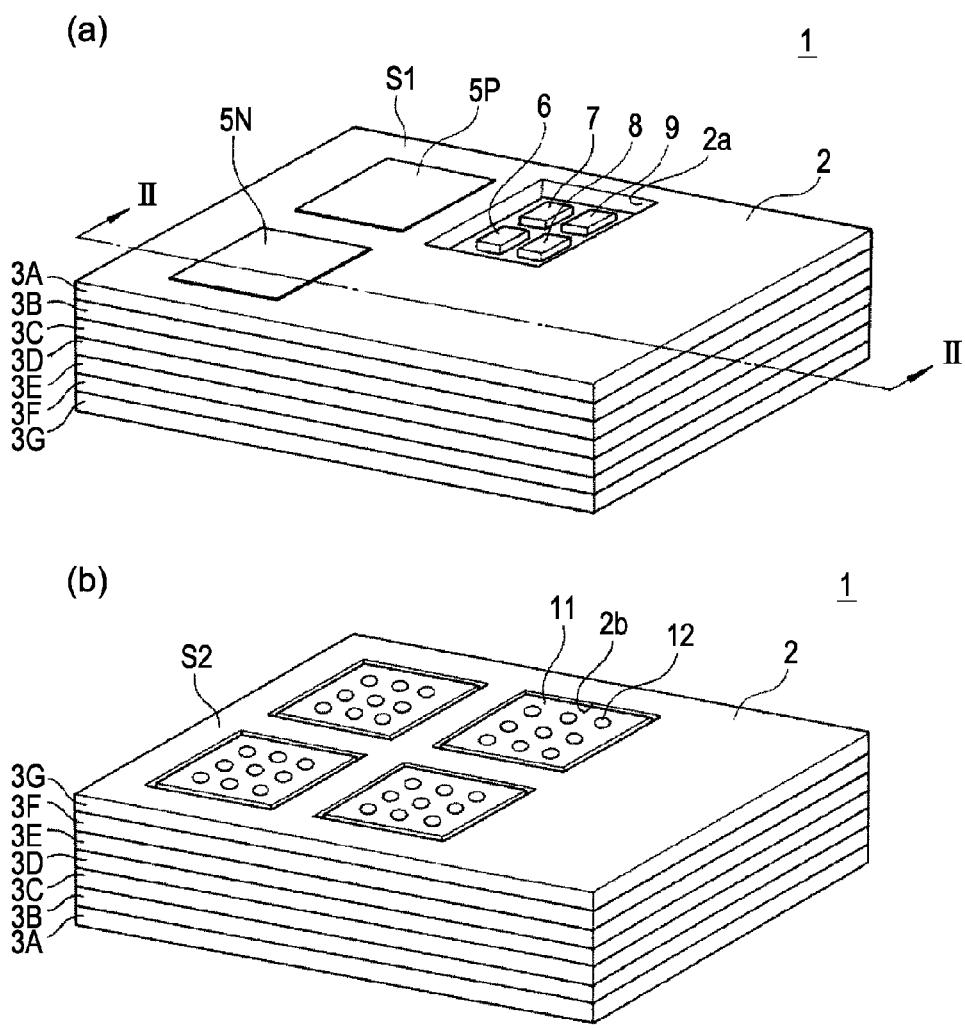
FIG. 1 is an exterior perspective view showing a fuel cell of an embodiment of the present invention.

FIG. 1 is a perspective view showing an exterior of a fuel cell 1 according to an embodiment of the present invention. More specifically, FIG. 1(a) is a diagram viewed from a first surface (one principal surface) S1 of the fuel cell 1, whereas FIG. 1(b) is a diagram viewed from a second surface (another principal surface) S2 that is the back surface of the first surface S1. Since FIG. 1 conceptually shows the fuel cell 1, openings of air flow channels 12, which will be described later, are shown larger.

The fuel cell 1 has a base body 2 formed in substantially rectangular parallelepiped shape. The base body 2 is constituted by, for example, a ceramic multilayer substrate. More specifically, the base body 2 is formed by a substantially thin rectangular parallelepiped layered body in which a first insulating layer 3A to a seventh insulating layer 3G (hereinafter, the insulating layers 3A to 3G may be referred to as "insulating layers 3" without distinction) of the same size, thickness, and shape are laminated. The insulating layers 3 are made of, for example, alumina ceramics and are formed to include glass components, such as, for example, $SiO_2$, $Al_2O_3$, MgO, ZnO, and $B_2O_3$, and alumina particles. The laminated insulating layers 3 are fired in the air atmosphere at, for example, 900° C.-1600° C.

Seven insulating layers 3 constituting the base body 2 are illustratively only and the number of the insulating layers 3 can be set accordingly. In addition, the plurality of insulating layers 3 does not have to have the same size, thickness, and shape. However, the use of the plurality of insulating layers 3 in the same size, thickness, and shape can reduce the production cost.

A positive terminal 5P and a negative terminal 5N (hereinafter, both terminals may be referred to as "terminals 5" without distinction) for supplying electric power from the fuel cell 1 to electronic devices are provided on the first surface S1. The terminals 5 are constituted by, for example, metal plate-like members to be laminated on the first surface S1.

In addition, a recess 2a is formed on the first surface S1. Various electronic components are arranged at the recess 2a. The various electronic components may be, for example, a power supply unit 6, a control unit 7, a capacitor 8, and a power supply unit 9 for a flow control unit, which will be described later.

Recesses 2b for containing cell main bodies 15 (not shown in FIG. 1), which will be described later, are formed on the second surface S2. The recesses 2b are covered with lids 11. A plurality of recesses 2b and lids 11, e.g., four recesses and four lids, are arranged on the second surface S2 corresponding to the number of the cell main bodies 15. The lids 11 are made of, for example, the same material as that of the insulating layers 3 and have an insulation property. Accordingly, the lids 11 can be considered as one of the insulating layers 3 constituting the base body 2.

Figure 2:
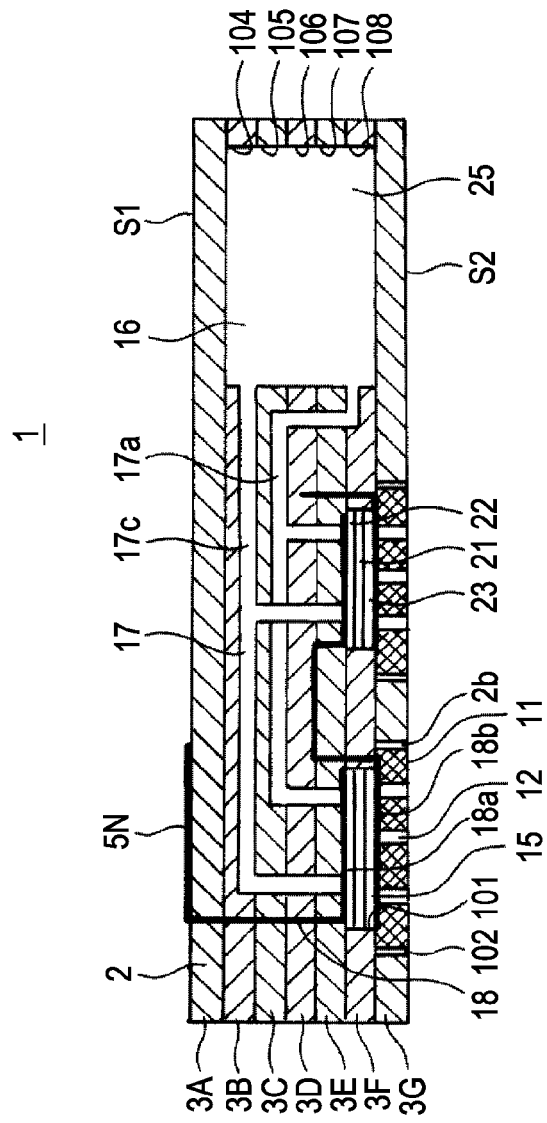
FIG. 2 is a sectional view in the direction of arrows II-II of FIG. 1.

FIG. 2 is a sectional view in the direction of arrows II-II of FIG. 1. Since FIG. 2 conceptually shows a configuration of the base body 2, a feeding channel 17a, a discharging channel 17c, and a conducting path 18, which are not located on the same cross section and will be described later, are shown. Additionally, FIG. 3 and FIG. 4 are exploded perspective views of the base body 2. Since FIG. 3 and FIG. 4 conceptually show a configuration of the base body 2, a fuel flow channel 17 is shown larger than that of FIG. 2. Accordingly, relative positions of the fuel flow channel 17 and the conducting path 18 are slightly shifted from those of FIG. 2 or FIG. 5 to be described later. In addition, the detail of the conducting path 18 is omitted.

As shown in FIG. 2, cell main bodies 15 that generate electricity through chemical reaction of fuel and oxygen, a fuel storage unit 16 that stores the fuel to be fed to the cell main bodies 15, the fuel flow channel 17 that leads the fuel stored in the fuel storage unit 16 to the cell main bodies 15, and the conducting path 18 that leads electric power from the cell main bodies 15 are provided in the base body 2.

The cell main body 15 is a so-called unit cell. Four cell main bodies 15 are arranged on an identical plane and are connected to each other through the conducting path 18. Meanwhile, the unit cells may be laminated or arranged at different positions both in plan view and in side view. Alternatively, only one unit cell may be provided. In addition, the number of the unit cells to be arranged may be set accordingly. When a plurality of unit cells are arranged at positions different from one another in plan view, a cathode of every cell can be brought closer to the atmosphere, which can make induction of the air easier and thickness thinner. Furthermore, since unit cells are readily connected in series or in parallel, high current or high voltage can be obtained readily.

The cell main body 15 includes an electrolyte member 21, an anode 22, and a cathode 23. The anode 22 and the cathode 23 sandwich the electrolyte member 21 therebetween. The cell main body 15 is constituted by, for example, a direct methanol fuel cell. The electrolyte member 21 is made of an ion-conductive film. The anode 22 and the cathode 23 are constituted by a porous member that carries a catalyst, such as platinum, and have functions of a catalyst layer and a gaseous diffusion layer.

The cell main body 15 is formed in the same thickness as that of the insulating layer 3, for example. The cell main body 15 is fitted and inserted to a hole 101 (see also FIG. 4(b)) provided in the sixth insulating layer 3F and is sandwiched by the fifth insulating layer 3E and the lid 11, thereby being fixed inside the base body 2. That is, the cell main body 15 is contained in the recess 2b provided on the second surface S2 with the opening of the recess 2b being covered with the lid 11.

Since the cell main body 15 is arranged in the hole 101 of the sixth insulating layer 3F, distances from the cell main body to the first surface 51 and to the second surface S2 are equivalent to thickness of five insulating layers 3 and thickness of one insulating layer 3, respectively. More specifically, the distance to the second surface S2 is shorter than the distance to the first surface 51 and the cell main body 15 is arranged more closely to the second surface S2. This can improve the flexibility in arrangement of a fuel flow channel and make induction of oxygen in the atmosphere easier, thus permitting highly efficient electricity generation.

The recess 2b containing the cell main body 15 is formed by the hole 101 in the sixth insulating layer 3F and a hole 102 (see also FIG. 4(c)) provided in the seventh insulating layer 3G. The side length of the hole 101 is smaller than that of the hole 102. The lid 11 is knocked against and fixed to the sixth insulating layer 3F at the fringe of the hole 101. The lid 11 is fixed using a suitable fixing member, such as, for example, solder, resin, an adhesive, or a screw. The lid 11 has the same thickness as the insulating layer 3 and the lid 11 is arranged not to protrude from the second surface S2. This can eliminate the protrusion of the cell main body 15 and permit miniaturization.

However, thickness of the cell main body 15 and thickness of the lid 11 are not limited to thickness of the insulating layer 3 and can be set accordingly. More specifically, the cell main body 15 and the lid 11 may be thinner or thicker than the insulating layer 3 or may be set equal to thickness of a plurality of insulating layers 3. In particular, it is preferable to set the cell main body 15 thicker than the insulating layer 3 or a plurality of insulating layers 3 and to compress the cell main body 15 with the lid 11 so as to make the thickness of the cell main body 15 equal to the thickness of the insulating layer 3 or the plurality of the insulating layers 3. This can increase the reliability of electrical connections between electrodes of the cell main body 15 and the conducting path 18.

Figure 5:
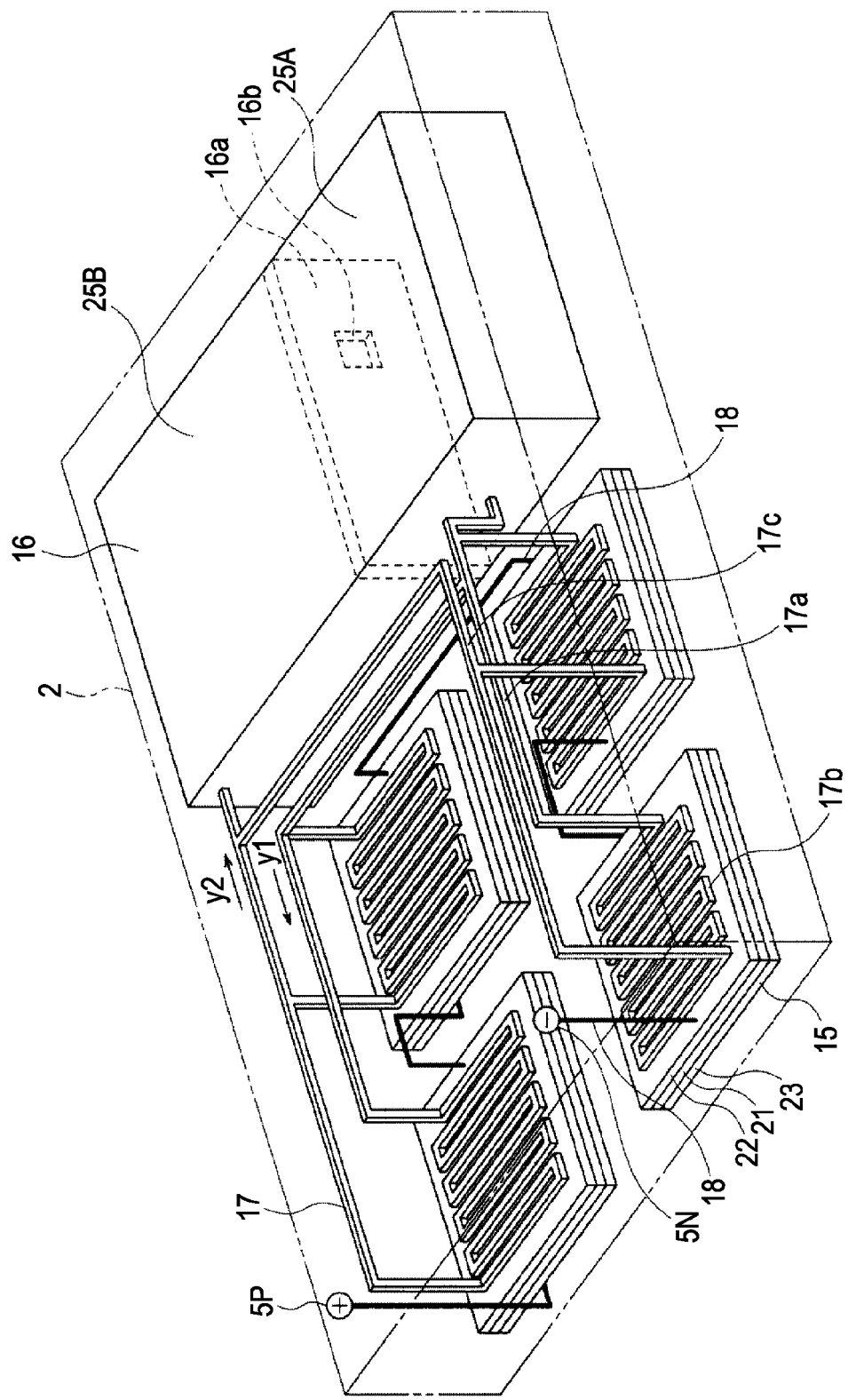
FIG. 5 is a perspective view showing an overview of a fuel flow channel and a conducting path of a fuel cell of FIG. 1.

FIG. 5 is a perspective view showing the fuel storage unit 16, the fuel flow channel 17, and the conducting path 18. FIG. 5 shows an overview of the fuel storage unit 16, the fuel flow channel 17, and the conducting path 18 and details, such as interconnections from the conducting path 18 to each of the electronic components 6-9, are omitted.

As shown in FIG. 2 and FIG. 5, the fuel storage unit 16 has storage spaces 25A and 25B (see also FIG. 5 and these may not be distinguished from one another by omitting the additional alphabets A and B). For example, the storage spaces 25A and 25B are formed by holes 104A-108A and holes 104B-108B (see also FIG. 3(b) to FIG. 4(b) and these may not be distinguished from one another by omitting the additional alphabets A and B) provided in the second insulating layer 3B to the sixth insulating layer 3F, which are linked to each other. For example, the holes 104 to the holes 108 are formed in the same size and shape, are provided at positions at which the holes face each other between the second insulating layer 3B and the sixth insulating layer 3F, and are formed in columnar shape (e.g., quadrangular prism shape). The storage space 25A and the storage space 25B are separated by a partition 16a. A hole 16b linking the storage spaces 25A and 25B is provided in the partition 16a. The storage spaces 25 are filled with fuel, such as methanol or hydrogen gas, through an opening, not shown.

Grooves (hollow portions) provided in the insulating layers 3 are linked to each other to form the fuel flow channel 17. Herein, the grooves include those (holes) penetrating the insulating layer 3 in the thickness direction. The grooves constituting the fuel flow channel 17 are formed by cutting the unlimited insulating layers 3.

The fuel flow channel 17 includes the feeding channel 17a that leads fuel in the fuel storage unit 16 to the cell main body 15 (in the direction of arrow y1), a contact portion 17b that is linked to the feeding channel 17a and in contact with the anode 22 of the cell main body 15, and the discharging channel 17c that is linked to the contact portion 17b and leads the fuel having reached the cell main body 15 back to the fuel storage unit 16 (in the direction of arrow y2). By including each of the portions 17a-17c, the fuel flow channel 17 forms a circulation channel that leads fuel from the fuel storage unit 16 and leads the fuel back to the fuel storage unit 16.

The fuel flow channel 17 is three-dimensionally arranged. More specifically, the arrangement is as follows.

As shown in FIG. 5 and FIG. 2, the feeding channel 17a is linked to the storage space 25A of the fuel storage unit 16, for example, between the fifth insulating layer 3E and the sixth insulating layer 3F and extends a little from the fuel storage unit 16 between the fifth insulating layer 3E and the sixth insulating layer 3F in parallel to the insulating layers 3 (see also a groove 110 of FIG. 4(b)). The feeding channel 17a then extends toward the first surface S1 to penetrate the fifth insulating layer 3E and the fourth insulating layer 3D (see also a hole 111 of FIG. 4(a) and a hole 112 of FIG. 3(d)). Thereafter, the feeding channel 17a extends between the fourth insulating layer 3D and the third insulating layer 3C in parallel to the insulating layers 3 (see also a groove 113 of FIG. 3(c)). On the way there, as shown in FIG. 5, the feeding channel 17a branches off to the distal side and the proximal side of FIG. 5 on an identical plane (on the identical insulating layer) for two cell main bodies 15 on the distal side of the paper and two cell main bodies 15 on the proximal side of the paper. Thereafter, as shown in FIG. 2, the flow channel corresponding to the cell main body 15 on the right of the paper branches off in the direction vertical to the insulating layers 3 from the flow channel in parallel to the insulating layers 3 and reaches the cell main body 15 (see also a hole 114 of FIG. 3(d) and a hole 115 of FIG. 4(a)). In addition, another flow channel branch in parallel to the insulating layers 3 curves in the direction vertical to the insulating layers 3 at the position corresponding to the cell main body 15 on the left of the paper and reaches the cell main body 15 (see also a hole 116 of FIG. 3(d) and a hole 117 of FIG. 4(a)). By dividing the feeding channel in the direction vertical to the insulating layers 3 in this manner, turbulences can be efficiently generated at the branch points to the vertical direction and fuel (e.g., a mixed solution of methanol and water) can be well mixed.

The discharging channel 17c is linked to the storage space 25B of the fuel storage unit 16, for example, between the second insulating layer 3B and the third insulating layer 3C and extends from the fuel storage unit 16 between the second insulating layer 3B and the third insulating layer 3C in parallel to the insulating layers 3 (see also a groove 119 of FIG. 3(b)). On the way there, as shown in FIG. 5, the discharging channel 17c branches off to the distal side and the proximal side of FIG. 5 on an identical insulating layer for two cell main bodies 15 on the distal side of the paper and two cell main bodies 15 on the proximal side of the paper. Thereafter, as shown in FIG. 2, the flow channel in parallel to the insulating layers 3 for the cell main body 15 on the right of the paper branches off in the direction vertical to the insulating layers 3 and reaches the cell main body 15 (see also a hole 120 of FIG. 3(c), a hole 121 of FIG. 3(d), and a hole 122 of FIG. 4(a)). The another flow channel branch in parallel to the insulating layers 3 curves in the direction vertical to the insulating layers 3 at the position corresponding to the cell main body 15 on the left of the paper and reaches the cell main body 15 (see also a hole 123 of FIG. 3(c), a hole 124 of FIG. 3(d), and a hole 125 of FIG. 4(a)). The direction of the fuel flowing through the discharging channel 17c is opposite to the description order of each part of the discharging channel 17c.

Part of the feeding channel 17a extending in parallel to the insulating layers 3 (between the third insulating layer 3C and the fourth insulating layer 3D) and part of the discharging channel 17c extending in parallel to the insulating layers 3 (between the second insulating layer 3B and the third insulating layer 3C) are parallel to each other in side view (viewed in the direction parallel to the insulating layer 3). Additionally, in plan view (viewed in the direction vertical to the insulating layer 3), these parts extend in parallel to each other at a relatively short distance. Accordingly, the part of the discharging channel 17c is arranged along the feeding channel 17a.

In addition, as shown in FIG. 5, the fuel flowing directions in the feeding channel 17a and in the part of the discharging channel 17c along the feeding channel 17a are opposite to one another as is clear from the arrow y1 indicating the fuel flowing direction in the feeding channel 17a and the arrow y2 indicating the fuel flowing direction in the discharging channel 17c.

At the part of the discharging channel 17c along the feeding channel 17a, the distance between these portions is equal to the thickness of one insulating layer 3 in side view and is relatively close. FIG. 5 or the like illustrates a case where the discharging channel 17c is arranged slightly on the outer side of the feeding channel 17a in plan view so that the feeding channel 17a and the discharging portion 17c do not join together at parts where these portions penetrate the insulating layers 3. However, most of these portions may be arranged to overlap each other in plan view and shifted from one another only at positions near the penetrated parts of the insulating layers 3 in plan view and the distance between the discharging channel 17c and the feeding channel 17a may be set equal to the thickness of one insulating layer 3. In addition, when there is a distance between the discharging channel 17c and the feeding channel 17a in plan view as shown in FIG. 5 or the like, the distance in the plan view may be set, for example, approximately equal to or smaller than the thickness of one insulating layer 3.

As shown in FIG. 2, the distance between the discharging channel 17c and the first surface S1 is shorter than thickness of two insulating layers 3, whereas the distance between the feeding channel 17a and the first surface S1 is longer than that between the discharging unit 17c and the first surface by thickness of one insulating layer 3. In addition, the distance between the feeding channel 17a and the first surface S2 is equal to or greater than thickness of four insulating layers 3 and is longer than that between the discharging channel 17c and the first surface S1. That is, the discharging channel 17 is arranged more closely to the surface of the base body 2 than the feeding channel 17a. This can bring fluid, whose temperature is raised by the heat generated at the cell main bodies 15 and which flows through the discharging channel, closer to the outside air and can radiate the heat satisfactory.

In addition, although a cross section of the feeding channel 17a or the discharging portion 17c before the branching and a cross section of each flow channel after the branching are shown equally in the drawings, the pre-branching cross section may be set equal to a sum of the post-branching cross sections of each flow channel. This allows flow velocity (pressure) to be kept constant before and after the branching.

The feeding channel 17a branches off into four corresponding to four cell main bodies 15 and each branch is connected to the corresponding main body 15. However, the feeding channel 17a may further branch off after branching off into four and may be connected to one cell main body 15 with a plurality of positions. The same applies to the discharging channel 17c. This allows fuel to be fed to each cell main body 15 at the same concentration and generation of electricity to be performed evenly and efficiently at each cell main body 15. Conversely, the feeding channel 17a and the discharging channel 17c may not be divided at all from the fuel storage unit 16 and the discharging channel having reached one cell main body 15 may also serve as the feeding channel to be connected to another cell main body 15. More specifically, one flow channel may be serially connected to a plurality of cell main bodies 15. This makes a configuration of each flow channel simpler and can improve the productivity.

FIG. 6(a) is a top view of the contact portion 17b (a diagram viewed in a direction vertical to the insulating layers 3), whereas FIG. 6(b) is a sectional view in the direction of arrows VIb-VIb of FIG. 6(a).

As shown in FIG. 6(a), the feeding channel 17a and the discharging channel 17c reach the cell main body 15 at positions near marginal parts of the cell main body 15 on the opposite sides and are linked to ends of the contact portion 17b. The contact portion 17b tortuously extends from a point linked to the feeding channel 17a to a point linked to the discharging channel 17c and stretches all over a surface of the cell main body 15.

As shown in FIG. 6(b), the contact portion 17b is formed by grooves provided on a surface of the fifth insulating layer 3E near the cell main body 15 and is in contact with the anode 22 of the cell main body 15. The anode 22 is made of a porous material. Fuel flowing through the contact portion 17b flows into the electrolyte member 22 through the anode 22. That is, the contact portion 17b is in contact with the electrolyte member 22.

In addition, the air flow channel 12 for leading air (oxidation gas) to the cell main body is formed in the lid 11 (see also FIG. 1). The air flow channel 12 of the lid 11 includes a portion penetrating the lid 11 from a side of the first surface S1 to a side of the cell main body 15 and a portion formed by grooves provided on the lid 11 near the cathode 23, tortuously extending like the contact portion 17b, and stretching all over the cathode 23.

The conducting path 18 shown in FIG. 2 is provided in the main body 2 using, for example, the same forming method as that for conducting paths on conventional ceramic multilayer substrates. More specifically, conductive paste including conductive materials, such as silver-based, cupper-based, tungsten-based, molybdenum-based, platinum-based materials, is applied onto surfaces of the unlaminated insulating layers 3 or is charged in through holes formed in the insulating layers 3 and the insulating layers 3 are then laminated and fired, whereby the main body 2 with the conducting path 18 is obtained.

Accordingly, the conducting path 18 has a portion extending between one insulating layer 3 and another insulating layer 3 in parallel to the insulating layers 3 and a portion penetrating the insulating layers 3. The conducting path 18 is three-dimensionally arranged inside the main body 2. For example, the conducting path 18 is arranged to serially connect four cell main bodies. More specifically, the arrangement is as follows.

As shown in FIG. 2 and FIG. 5, the conducting path 18 penetrates the first insulating layer 3A to the fifth insulating layer 3E from the negative terminal 5N (see also a conductor 201 of FIG. 3(a), a conductor 202 of FIG. 3(b), a conductor 203 of FIG. 3(c), a conductor 204 of FIG. 3(d), and a conductor 205 of FIG. 4(a)) and reaches an anode-side conductive film 18a that faces the anode 22 of the cell main body 15. Since middle part of the conducting path 18 is connected to the power supply unit 6 provided at the recess 2a (see FIG. 1) and extends from the power supply unit 6 to the cell main body 15, the conducting path 18 is actually in more complex shape than that shown in the conceptual diagrams of FIG. 2 and FIG. 5.

As shown in FIG. 6(a) and FIG. 6(b), the anode-side conductive film 18a is formed on an anode-22-side surface of the fifth insulating layer 3E and is provided all over the surface touching the anode 22 excluding an area where the contact portion 17b is arranged. On the other hand, on a cathode-23-side surface of the lid 11, a cathode-side conductive film 18b is formed all over the surface touching the cathode 23 excluding an area where the air flow channel 12 is arranged (see also FIG. 4(d)). The anode-side conductive film 18a and the cathode-side conductive film 18b function as a charge collector.

As shown in FIG. 2 and FIG. 5, the conducting path 18 extending from the cathode-side conductive film 18b penetrates the sixth insulating layer 3F and the fifth insulating layer 3E, then curves to be in parallel to the insulating layers 3, and extends between the fifth insulating layer 3E and the fourth insulating layer 3D (see also a conductor 206 of FIG. 4(b) and a conductor 207 of FIG. 4(a)). Thereafter, the conducting path 18 penetrates the fifth insulating layer 3E (see also a conductor 207 of FIG. 4(a)) and is connected to the anode-side conductive film 18a corresponding to the cell main body 10 on the right of the paper. Thereafter, the conducting path 18 extends in the similar manner so that the cathode 23 is connected to the anode 22 of the adjacent cell main body 15.

The conducting path 18 extending from the cathode 23 of the cell main body 15 located immediately under the positive terminal 5P penetrates the sixth insulating layer 3F to the first insulating layer 3A (see also a conductor 208 of FIG. 4(b), a conductor 209 of FIG. 4(a), a conductor 210 of FIG. 3(d), a conductor 211 of FIG. 3(c), a conductor 212 of FIG. 3(b), and a conductor 213 of FIG. 3(a)) and is connected to the positive terminal 5P. Since middle part of the conducting path 18 is connected to the power supply unit 6 provided in the recess 2a (see FIG. 1) and extends from the power supply unit 6 to the positive terminal 5P, the conducting path 18 is actually in more complex shape than that of the conceptual diagrams of FIG. 2 and FIG. 5.

Figure 7:
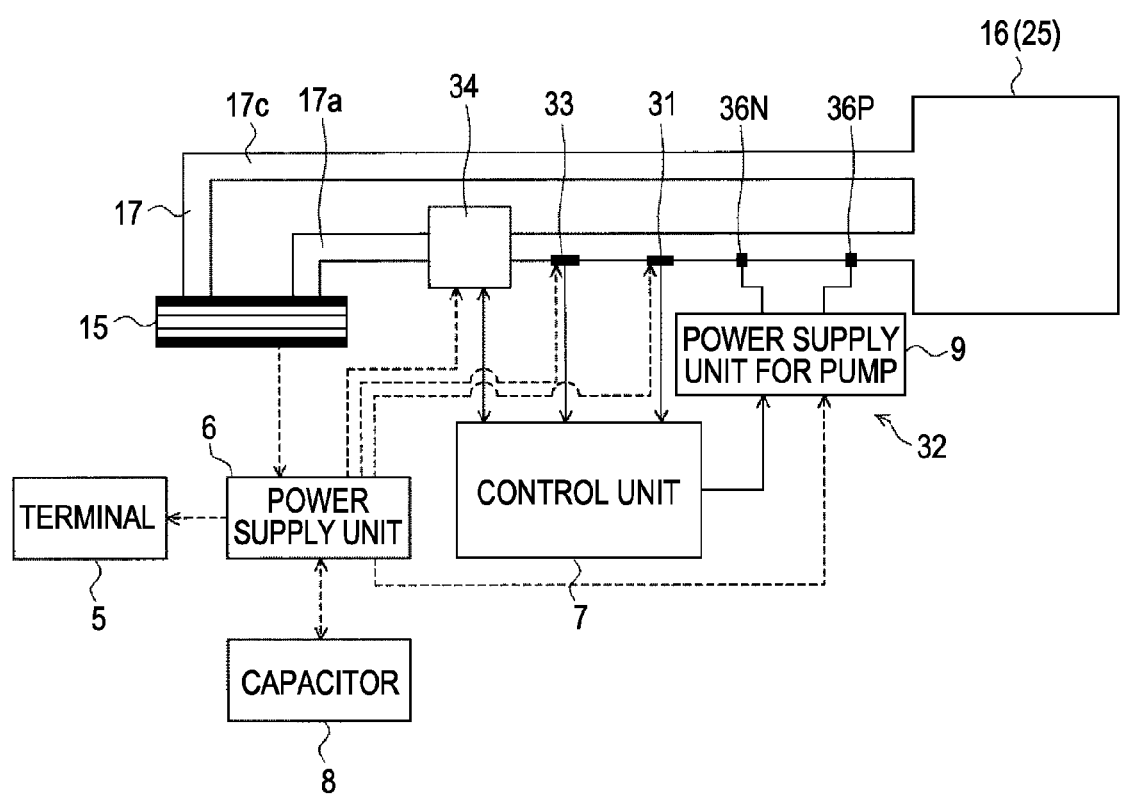
FIG. 7 is a block diagram showing a configuration of an electrical system of a fuel cell of FIG. 1.

FIG. 7 is a block diagram showing a configuration of an electrical system of the fuel cell 1. In the drawing, solid arrows indicate signal channels, whereas dotted arrows shows electric power feeding channels.

As shown in FIG. 1, the power supply unit 6, the control unit 7, the capacitor 8, and the power supply unit 9 for a flow control unit are contained in the recess 2a. The recess 2a is formed deeper than thickness (height) of the various electronic components 6-9 so that the electronic components 6-9 do not protrude from the first surface 51. For example, the recess 2a is formed by providing a hole 131 (see also FIG. 3(a)) in the first insulating layer 3A.

A lid or the like covering the recess 2a is not provided in FIG. 1, which offers advantages of a low cost and an excellent heat releasing effect. However, the recess 2a may be covered with a lid. In this case, there are advantages of waterproof and dustproof effects. In addition, when the recess 2a is covered with a lid, the recess 2a may be formed deeper than thickness of one insulating layer 3 and a lid having thickness similar to that of the insulating layer 3 may be knocked against and fixed to the second insulating layer 3B as in the case of storage of the cell main body 15.

As shown in FIG. 7, electric power from the cell main body 15 is fed to the power supply unit 6. The power supply unit 6 is, for example, a DC/DC converter. The direct current generated in the cell main body 15 is converted into appropriate voltage by the power supply unit 6 and is output to various electronic components, such as terminals 5, the control unit 7, the capacitor 8, the power supply unit 9 for a flow control unit.

The capacitor 8 is for stabilizing voltage of electric power fed from the power supply unit 6. More specifically, electric power fed from the cell main body 15 changes depending on a state of the cell main body 15. Additionally, an amount of consumed electric power also changes depending on operation states of various electronic components provided on the fuel cell 1 and operation states of electronic devices connected to the terminals 5. Accordingly, for example, when power consumption is large, electric power may be insufficient for the demand. Conversely, excessive electric power may be generated.

Accordingly, when an amount of electric power fed from the cell main body 15 exceeds the power consumption, the power supply unit 6 stores the electric power in the capacitor 8. When electric power fed from the cell main body 15 falls below the power consumption, the power supply unit 6 supplies the electric power stored in the capacitor 8 to various electronic components. This enables electronic devices to operate stably.

FIG. 1 illustrates a case where the capacitor 8 is constituted by a capacitor element that is an independent component and is mounted on the recess 2a. However, since the insulating layers 3 function as a dielectric material, conductive films may be arranged between the insulating layers 3 or on surfaces of the main body 2 to sandwich the insulating layer 3 and part of or whole main body 2 may function as a capacitor.

The control unit 7 shown in FIG. 7 is for controlling operations of various electronic components provided on the fuel cell 1 and is constituted by, for example, an IC including a CPU, a ROM, a RAM. More specifically, a flow control unit 32 controls a flow of fuel on the basis of fuel flow velocity detected by a flow velocity sensor 31. One example of the flow control unit 32 may be a pump. The control unit 7 controls the operations of a flow control unit 32, and also controls, on the basis of fuel concentration detected by a concentration sensor 33, operations of a concentration adjusting unit 34 for controlling the fuel concentration. Meanwhile, the fuel flow control operation means to control fuel flow velocity and a flow rate.

The flow velocity sensor 31 includes, for example, a resistor touching a flow channel and a resistance meter for measuring resistance of the resistor (both are not shown) and carries out measurement utilizing a fact that a change in velocity causes a change in temperature of the resistor and this causes a change in the resistance. In this case, the resistor, the conducting path 18 connecting the resistor and the resistance meter, and the conducting path 18 connecting the resistance meter and the control unit 7 are provided on, for example, the unlaminated insulating layers 3 and the resistance meter is provided in the recess 2a or the like after the base body 2 is fired.

The flow velocity sensor 31 is not limited to the above-mentioned configuration and may be constituted by a suitable sensor such as a sensor utilizing a pitot tube. Like the cell main body 15, a recess linked to the fuel flow channel 17 may be provided on part of the main body 2, a sensor may be arranged in the recess, and the recess may be covered with a lid. In addition, since a cross section of the fuel flow channel 17 is constant, measurement of the flow velocity is equivalent to measurement of the flow rate.

When fuel is methanol solution, for example, the flow control unit 32 may be constituted by an electroosmotic flow control unit (in general, it may be called an electroosmotic flow pump). The flow control unit 32 includes the power supply unit 9 for the flow control unit, a positive electrode 36P and a negative electrode 36N (hereinafter, these may be referred to as "electrodes 36" without distinction) to which voltage is applied by the power supply unit 9.

The power supply unit 9 is, for example, a DC/DC converter. For example, the electrodes 36 are provided on the feeding channel 17. The positive electrode 36P is arranged on the upstream side of the negative electrode 36N. The electrodes 36 and the conducting path 18 connecting the electrodes 36 and the power supply unit 9 are provided on, for example, the unlaminated insulating layers 3. The power supply unit 9 is provided in the recess 2a after the main body 2 is fired.

Figure 12:
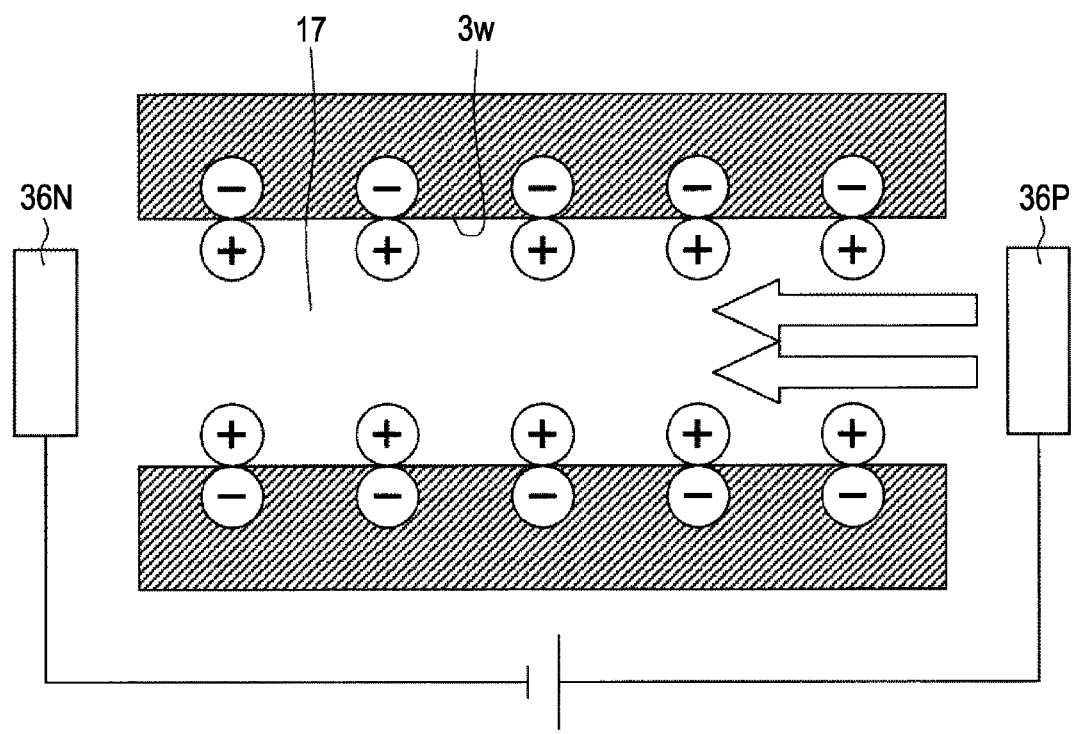
FIG. 12 is a diagram describing the principle of an electroosmotic flow control unit.

FIG. 12 is a diagram describing a principle of an electroosmotic flow control unit. Upon touching methanol solution, walls 3w forming the fuel flow channel 17 are negatively charged. The negative charges attract positive charges in the solution to the walls 3w of the fuel flow channel 17 and the charges are localized. When the power supply unit 9 for the flow control unit applies voltage to the electrodes 36, the positive charges move toward the negative electrode 36N. At that time, since the movement drags the surrounding solution, the entire solution flows toward the negative electrode 36N.

For example, the control unit 7 controls voltage to be applied to the electrodes 36 by the power supply unit 9 on the basis of a detection result of the flow velocity sensor 31 so that the flow velocity becomes predetermined velocity. Meanwhile, the flow velocity sensor 31 may be omitted. In this case, for example, the control unit 7 controls operations of the power supply unit 9 so that predetermined voltage is applied or operations of the power supply unit 9 so that an amount of electricity generated by the cell main body 15, which is detected by the power supply unit 6 or like, becomes a predetermined value.

The concentration sensor 33 is, for example, provided inside the fuel flow channel 17. The concentration sensor 33 includes a pair of electrodes (not shown) covered with an insulating film and a measuring instrument (not shown) for measuring capacitance (permittivity) between the pair of electrodes. The concentration sensor 33 identifies fuel concentration on the basis of the capacitance measured by the measuring instrument and a correlation between the inter-electrode fuel concentration and the inter-electrode capacitance. In this case, the electrodes covered with insulating films and the conducting path 18 connecting the electrodes and the measuring instrument are provided on the unlaminated insulating layers 3, for example. The measuring instrument is provided in the recess 2a or the like after the main body 2 is fired. Since the insulating layers 3 can serve as an insulator for insulating the electrodes from fuel, a concentration measuring capacitor may be formed by, for example, embedding electrodes in the third insulating layer 3C and the fourth insulating layer 3D sandwiching the feeding channel 17a (see FIG. 2). In addition, the concentration sensor 33 is not limited to a sensor for measuring capacitance and may be constituted by a suitable sensor, such as one for measuring a boiling point of fuel.

When fuel is a gas, such as hydrogen or methanol gas, the concentration adjusting unit 34 is constituted by, for example, a gas-liquid separator. More specifically, the gas-liquid separator cools fuel to a predetermined temperature so as to decrease an amount of saturated water vapor and cause water to condense, thereby eliminating excessive water from the fuel to adjust the concentration of the fuel. In this case, as in the case of the fuel flow channel 17, a gas-liquid separation chamber, a drain for the condensed water, and a flow channel for allowing a refrigerant to pass through (all of these are not shown) can be constituted by linking grooves provided in the insulating layers 3. In addition, when a temperature sensor is provided in the gas-liquid separator, the temperature sensor may be constituted by, for example, a sensor for detecting temperature according to a change in resistance of a resistor and may be provided on the main body 2 as in the case of the flow velocity sensor including the aforementioned resistor.

The control unit 7 controls operations of the concentration adjusting unit 34 on the basis of a detection result of the concentration sensor 33 so that temperature in the gas-liquid separation chamber becomes a temperature corresponding to a target concentration. Meanwhile, the concentration sensor 33 may be omitted. In this case, for example, the control unit 7 adjusts the temperature in the gas-liquid separation chamber to a preset level and controls operations of the concentration adjusting unit 34 so that an amount of electricity generated by the cell main body 15, which is detected by the power supply unit 6 or the like, becomes a preset value.

FIG. 8 shows a modification of a fuel storage unit. More specifically, FIG. 8(a) is a perspective view. FIG. 8(b) is a sectional view in the direction of arrows VIIIb-VIIIb of FIG. 8(a). FIG. 8(c) is a partially enlarged view of FIG. 8(b).

A fuel storage unit 16' is configured so that a fuel feeding cartridge 71 is removable. More specifically, the configuration is as follows.

A storage space 25' of the fuel storage unit 16' is formed by linking notches provided in a second insulating layer 3B' to a sixth insulating layers 3F' to each other. The notches are formed, for example, in rectangular shape, whereas the storage space 25' is formed in rectangular parallelepiped shape.

The cartridge 71 is formed in shape fitting the storage space 25' and is, for example, in rectangular parallelepiped shape. The cartridge 71, like the base body 2', may be formed by layered ceramics or may be formed by metal or resin. An internal space 71s of the cartridge 71 is filled with fuel, such as hydrogen or methanol.

Upon the cartridge 71 being inserted into the storage space 25', a pipe (a connecting portion) 72 provided in the fuel storage unit 16' is inserted into an opening 71a provided in the cartridge 71 as shown in FIG. 8(b). At this time, as shown in FIG. 8(c), a valve 73 urged by a spring 74 to block the opening 71a is pushed open by the pipe 72 and a fuel flow channel 17' is linked to the internal space 71s. The pipe 72 is made of, for example, metal or resin. Two pipes for feeding fuel from the cartridge 71 and for returning the fuel to the cartridge 71 are provided (only one is shown in FIG. 8).

Falling off of the cartridge 71 from the fuel storage unit 16' can be prevented, for example, by providing catches for engaging with each other in the cartridge 71 and the fuel storage unit 16' or covering the storage space 25' with a lid after inserting the cartridge 71.

Figure 9:
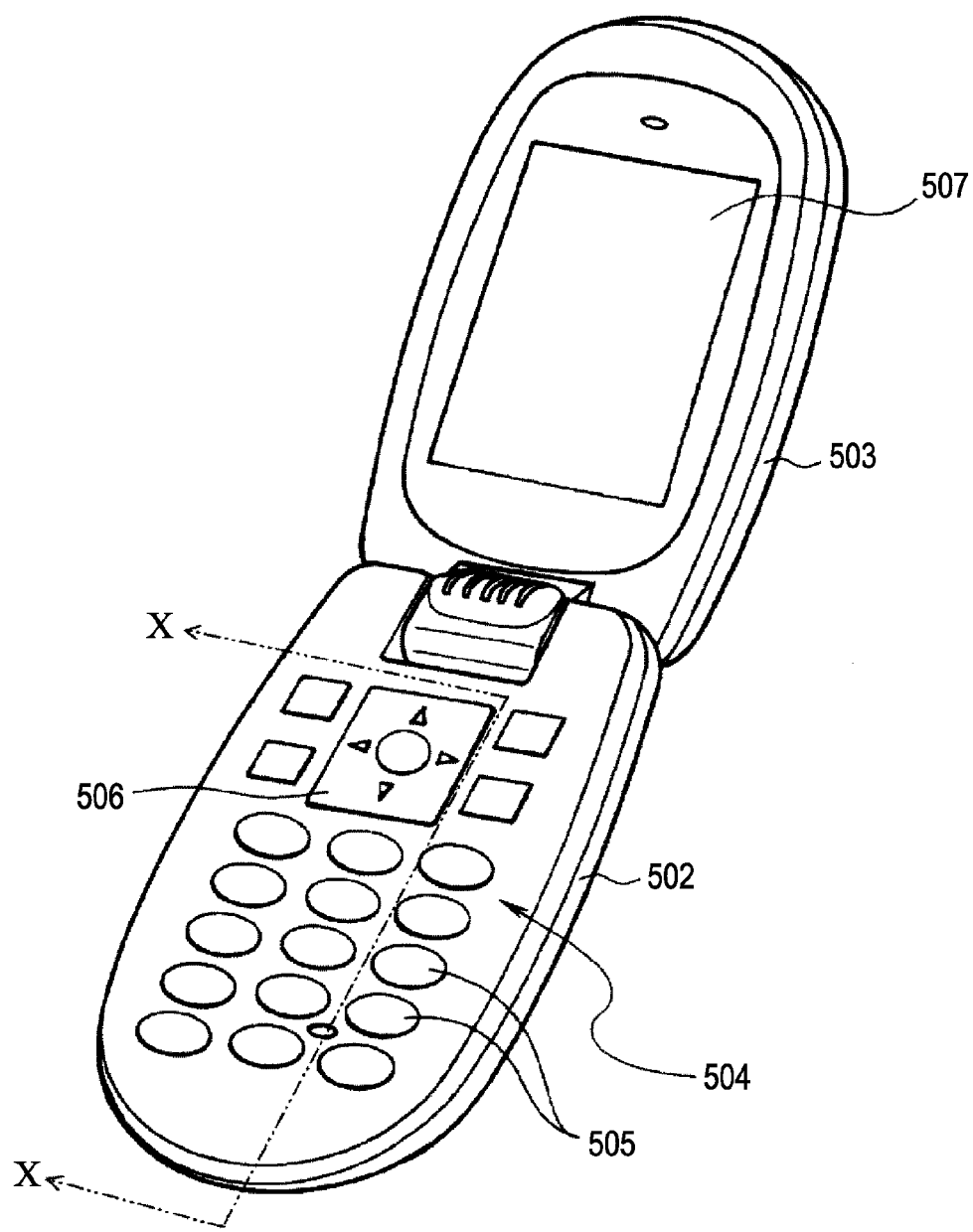
FIG. 9 is an exterior perspective view of a mobile phone to which a fuel cell of FIG. 1 is removably attached.

FIG. 9 shows a mobile phone (a mobile electronic device) 501 as an electronic device to which the above-described fuel cell 1 is attached. The mobile phone 501 is configured as a so-called flip mobile phone. A transmitter housing 502 is rotatably coupled to a receiver housing 503.

An operation unit 504 for receiving input operations to the mobile phone 501 is provided on the transmitter housing 502. Various push buttons, such as dial keys 505 and a cursor key 506, are arranged on the operation unit 504. A display unit 507 for displaying various kinds of information is provided on the receiver housing 503. The display unit 507 is constituted by, for example, a liquid crystal display.

Figure 10:
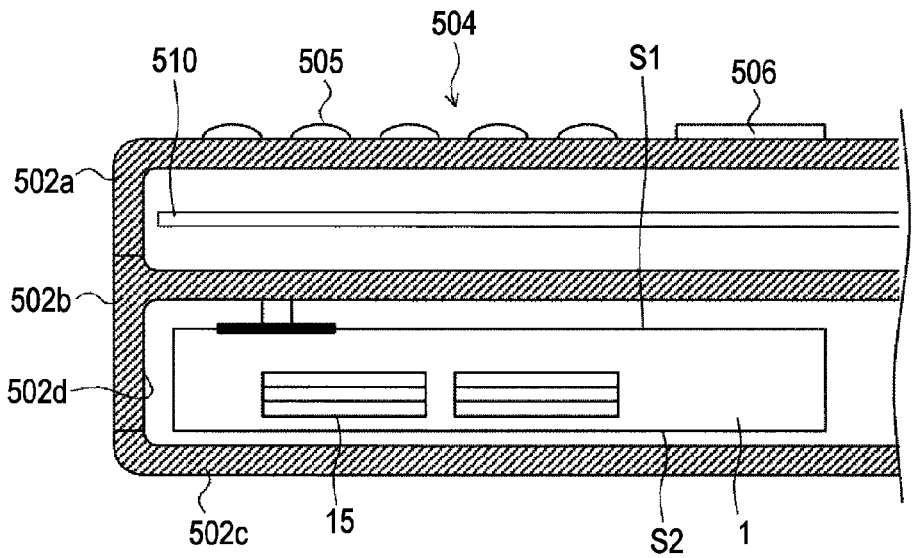
FIG. 10 is a sectional view in the direction of arrows X-X of FIG. 9.

FIG. 10 is a sectional view in the direction of arrows X-X of FIG. 9. The transmitter housing 502 includes an upper cover 502a on the side of the operation unit 504, a lower cover 502b on the back side thereof (lower side of the paper), and a lid 502c to be put on the lower cover 502b. The fuel cell 1 is contained in a battery storage unit 502d formed by the lower cover 502b and the lid 502c.

The fuel cell 1 is stored in the battery storage unit 502d with the first surface S1 facing the inner side of the transmitter housing 502. The second surface S2 is covered with the lid 502c. Terminals 511 are provided on the lower cover 502b at positions facing the terminals 5. The terminals 5 are connected to the terminals 511, whereby electric power of the fuel cell 1 is fed to various electronic components of the mobile phone 501.

For example, a circuit board 510, on which, for example, a high-frequency circuit or the like is mounted, is arranged on a side of the lower cover 502b opposite to the battery storage unit 502d, i.e., between the upper cover 502a and the lower cover 502b.

Figure 11:
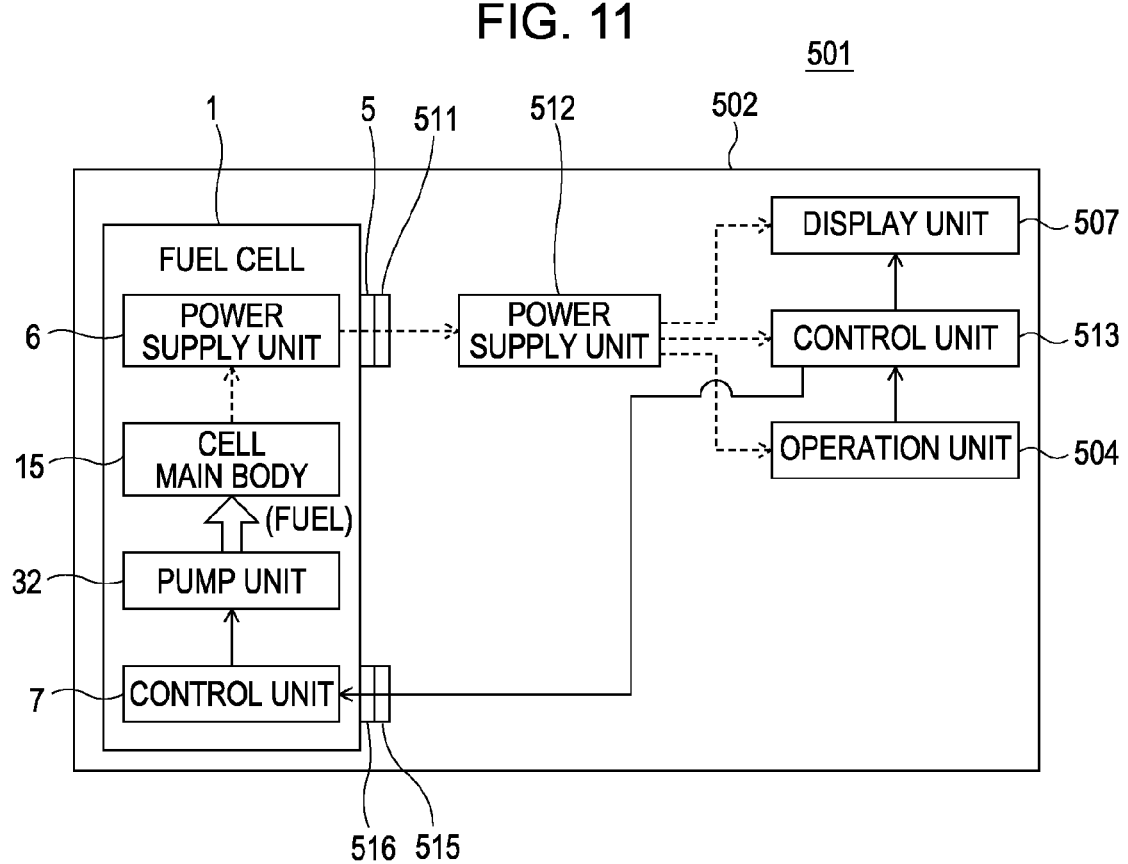
FIG. 11 is a block diagram showing a configuration of an electrical system of a mobile phone of FIG. 9.

FIG. 11 is a block diagram showing a configuration of an electrical system of the mobile phone 501. In the drawing, solid arrows indicate signal channels, whereas dotted arrows indicate electric power channels.

The electric power of the fuel cell 1 is fed to a power supply unit 512 of the mobile phone 501 through the terminals 5 and the terminals 511. The power supply unit 512 converts the fed electric power into predetermined voltage and supplies the electric power to various electronic components, such as the display unit 507.

The mobile phone 501 includes a control unit (an operation control unit and a response control unit) 513 for performing various control operations. The control unit 513 is constituted by, for example, an IC including a CPU, a ROM, and a RAM. The operation unit 504 outputs signals corresponding to pressed keys to the control unit 513. The control unit 513 executes processing corresponding to the signals from the operation unit 504 according to programs stored in the ROM or the like. The processing executed by the control unit 513 includes, for example, a control operation of the display unit 507. The control unit 513 outputs various signals to the display unit 507, such as to output image data corresponding to display content to the display unit 507. More specifically, the control unit 513 controls display content of the display unit 507 on the basis of the input information from the operation unit 504.

In addition, the mobile phone 501 includes electronic components, such as, for example, a high-frequency circuit for performing radio communication, a microphone for transmission, a speaker for reception, and a speaker utilized in informing incoming calls and playback of music, and a camera module.

The power consumption in the mobile phone 501 changes depending on operation states of various electronic components, such as the display unit 507. For example, since the display unit 507 does not display images while the mobile phone 501 is folded, the power consumption is less than that consumed while the mobile phone 501 is kept open. Since the volume is turned up when music is played back, the power consumption of an amplifier of the speaker increases. Thus, even if a constant level of electric power is supplied from the fuel cell 1, supplied electric power may be insufficient for the demand. Conversely, excessive electric power may be generated.

Accordingly, the mobile phone 501 controls electricity generation of the fuel cell 1 so that an amount of electricity generated by the fuel cell 1 changes according to operation states of various electronic components, such as the display unit 507. For example, the control operation is as follows.

The control unit 513 stores an amount of electricity consumed in each operation performed by various electronic components, such as the display unit 507, in a ROM or the like. On the other hand, since the control unit 513 controls operations of the various electronic components, the control unit 513 can grasp operations performed by the electronic components. Therefore, the control unit 513 can calculate electronic power needed by the mobile phone 501 by adding amounts of electric power currently consumed in the various electronic components. The consumed electric power to be added includes a constant level of electric power consumed due to power-on of the mobile phone 501 regardless of operations of various electronic components.

The control unit 513 then outputs the calculated amount of necessary electric power to the control unit 7 of the fuel cell 1. The control signals are output from the control unit 513 to the control unit 7 through a connection portion 515 provided inside the housing of the mobile phone 501 and a connection portion 516 provided on the base body 2 of the fuel cell 1, connection portion 516 and connection portion 515 are attached together.

The control unit 7 of the fuel cell 1 controls operations of the flow control unit 32 so that the flow velocity (fuel rate) of fuel to be fed to the cell main body 15 becomes a value according to the necessary electric power. In this manner, the amount of generated electricity of the fuel cell 1 is set to a value according to the operation state of the mobile phone 501.

According to the above-described embodiment, since the base body 2 is formed by a layered body having a plurality of insulating layers 3 being laminated and the fuel flow channel 17 is formed by linking grooves provided in different insulating layers 3, the fuel flow channel 17 can be three-dimensionally arranged. That is, the flexibility in arrangement of the fuel flow channel 17 can be improved. Additionally, since the fuel flow channel 17 is formed inside the base body 2, pipes do not have to be arranged around the base body 2, which can simplify the exterior of the fuel cell 1.

Since the electrolyte member 21 is sandwiched by the insulating layers 3 constituting the base body 2, the electrolyte member 21 can be arranged in the base body 2 and the electrolyte member 21 can be insulated. More specifically, since the base body 2 also serves as an insulator, an insulator does not have to be provided separately from the base body of a fuel cell unlike the related art, which can promote miniaturization of the fuel cell.

Since the insulating layers 3 are made of a ceramic material, ceramic multilayer substrate techniques, which have been studied, can be utilized. In addition, the use of alumina ceramics enables formation of base body 2 having excellent heat resistance and insulation.

Since the fuel flow channel 17 forms a circulation channel, fuel having passed through the flow channel touching the electrolyte member but not having been utilized in generation of electricity can be reused by sending the fuel to the electrolyte member 21 again. Since such a circulation channel enabling the reuse is provided inside the base body 2 constituted by a multilayer substrate, modularization of a whole fuel cell system including a fuel circulating system and miniaturization of the whole system are easy. Since electricity-generating reaction is likely to occur at a predetermined temperature range (e.g., 60-80° C.), the temperature is preferably set to this range to perform efficient electricity generation. When fuel is supplied to a flow channel of a base body from an external feeding channel like in the related art, a temperature difference between the external feeding channel and the base body exists, which causes the temperature of the fuel to vary and decreases the efficiency. In this embodiment, by forming a circulation channel inside the base body 2, a change in the fuel temperature can be reduced.

The storage space 25A for feeding fuel to the feeding channel 17a and the storage space 25B for receiving the fuel returning from the discharging channel 17c are separated by the partition 16a. In this case, relatively thin fuel is prevented from being supplied directly to the feeding channel 17a from the discharging channel 17c. The shape of the partition 16a and the position and shape of the hole 16b linking the storage space 25A and the storage space 25B may be set accordingly.

Since the fuel storage unit 16 is connected to the fuel flow channel 17, the fuel cell 1 can generate electricity for a long time without adding fuel to the fuel flow channel 17 from outside of the fuel cell 1 and the portability of the fuel cell 1 improves. Additionally, since such a fuel storage unit 16 is provided inside the base body 2 constituted by a multilayer substrate, modularization and miniaturization of a whole fuel cell system including a fuel feeding system are easy.

Furthermore, when the fuel storage unit 16 is configured to removably receive the fuel feeding cartridge 71, the further prolonged use is enabled by replacement of the cartridge 71, which further improves the portability. Since a recess for containing the cartridge 71 is formed by cutting some (the second insulating layer 3B' to the sixth insulating layer 3F') of the insulating layers 3 laminated in parallel to each other, parallel surfaces of the insulating layers 3 (the first insulating layer 3A' and the seventh insulating layer 3G') on both sides can be utilized as sliding surfaces of the cartridge 71.

Since part of the fuel flow channel 17 touching the electrolyte member 21 branches off into a plurality of channels, fuel can be efficiently fed to the electrolyte member 21 with the plurality of flow channels formed in parallel. When a fuel flow channel is formed by disposing a pipe therearound, divergence of the flow channel, namely, an increase in a number of flow channels, leads to an increase in a number of components and complication of the exterior. However, the arrangement of this embodiment does not cause such a problem. In addition, when a flow channel is divided to correspond to a plurality of electrolyte members 21, it becomes easier to increase the number of electrolyte members because fuel can be efficiently fed to the plurality of electrolyte members. Thus, modularization and miniaturization of a fuel cell including relatively many unit cells becomes easier. Preferably, a flow control unit is provided in each branch channel. Such a configuration can suppress flow rate differences caused in each branch channel and allows stable fuel feeding to be performed.

Since grooves forming the fuel flow channel 17 penetrate the insulating layers 3 in the thickness direction, a flow channel between one pair of insulating layers (e.g., between the third insulating layer 3C and the fourth insulating layer 3D) can be linked to a flow channel between another pair of insulating layers (e.g., between the fifth insulating layer 3E and the sixth insulating layer 3F). Thus, the three-dimensional fuel flow channel 17 can be readily formed.

Since the terminals 5 for outputting electric power are provided on a surface of the base body 2 and the conducting path 18 electrically connecting the terminals 5 to the electrolyte member 21 are provided inside the base body 2, interconnecting lines do not have to be provided around the fuel cell, which can simplify the exterior. Additionally, modularization and miniaturization of an output system of the fuel cell, from an electrolyte member to output terminals through a conducting path, are easy.

Since the discharging channel 17c downstream of a portion touching the electrolyte member 21 is arranged closer to a surface of the base body 2 than the feeding channel 17a upstream of the portion touching the electrolyte member 21, heat of fuel flowing through the discharging channel 17c can be efficiently released from the surface of the base body 2. Additionally, for example, a heat-releasing capability may be increased by meandering the discharging channel along a surface of a base body to increase an area of the discharging channel on the base body surface.

Since at least part of the discharging channel 17c is arranged along the feeding channel 17a, heat generated through chemical reaction at the electrolyte member 21 can be efficiently distributed by performing heat exchange between the discharging channel 17c and the feeding channel 17a.

Furthermore, since the direction of fuel flowing through part of the discharging channel 17c arranged along the feeding channel 17a is opposite to the direction of fuel flowing through the feeding channel 17a, a heat exchange can be efficiently performed between the feeding channel 17a and the discharging channel 17c. This is due to that heat is more likely to be trapped in fuel flowing through the discharging channel 17c on the anterior side (downstream side), where the flow direction and the heat propagation direction agree, than on the posterior side (the upstream side) and relatively low-temperature fuel flows through the feeding channel 17a from the anterior side.

Since the flow control unit 32 for controlling a flow of fuel in the fuel flow channel 17 is provided, an amount of generated electricity can be controlled according to various conditions, such as operation states of electronic components inside and outside a fuel cell. Additionally, since the flow control unit 32 is provided inside the base body 2 constituted by a multilayer substrate, modularization and miniaturization of a system for controlling an amount of generated electricity through a flow control operation are easy.

Since the flow control unit 32 is formed as an electroosmotic flow control unit, the flow control unit 32 can be miniaturized. Additionally, since an amount of fuel can be controlled by a more constant flow relative to other flow control units, a stable amount of generated electricity can be obtained. In addition, when the flow control unit 32 is provided inside a multilayer substrate, the flow control unit 32 can be formed utilizing grooves formed in the insulating layers 3.

Since the concentration adjusting unit 34 for adjusting the concentration of fuel by eliminating water from the fuel flowing through the fuel flow channel 17 is provided, dilution of the fuel by excessive water can be prevented. For example, since a direct methanol fuel cell prevents methanol from flowing to a cathode from an anode in order to avoid the crossover of methanol, excessive water generated at the electrolyte member 21 may be possibly mixed with methanol solution. The concentration adjusting unit 34 can eliminate such a possibility.

Since the terminals 5 to be electrically connected to the electrolyte member 21 are provided on the first surface 51 of the base body 2 and the electrolyte member 21 is arranged more closely to the second surface S2 of the base body 2, water or the like generated at the electrolyte member 21 is prevented from entering into electronic devices connected to the terminals 5 or electronic components in the electronic devices.

Since the recess 2b for containing the electrolyte member 21 is provided on the second surface S2 of the base body 2 and an opening of the recess 2b is covered with the lid 11 having the air flow channel 12, the electrolyte member 21 can be arranged after the lamination of the insulating layers 3. Thus, modularization and miniaturization of a fuel cell are easy. In addition, since the electrolyte member 21 and the outside air are separated only through the lid 11 and a through hole is provided in the lid 11, the air can be efficiently induced to the electrolyte member 21 and the water generated at the electrolyte member 21 can be efficiently discharged.

Since the electrolyte member 21 and various electronic components, such as the control unit 7, to be driven by electric power fed from the electrolyte member 21 are arranged inside the base body 2 constituted by a multilayer substrate, modularization and miniaturization of a fuel cell become easier.

Since the fuel cell 1 is modularized and miniaturized by the base body 2 constituted by a multilayer substrate, the fuel cell has high portability, persistence, and removal readiness. By including the fuel cell 1 in a mobile electronic device, such as the mobile phone 501, the portability and handling of the mobile electronic device also improve.

Additionally, since the mobile phone 501 controls supply of fuel to the electrolyte member 21 of the fuel cell 1 according to operation states of electronic components, such as the display unit 507, electricity can be generated according to necessary electric power and a shortage of electric power and generation of excessive electric power can be suppressed. In addition, since the fuel cell 1 is formed by the base body 2 constituted by a multilayer substrate and is modularized including the control unit 7 or the like, some of or all of fuel supply control operations can be assigned to the fuel cell.

The present invention is not limited to the above-described embodiment and can be carried out in various manners.

The electrolyte member includes all kinds of electrolytes, such as a solid polymer type, a phosphoric acid type, an alkaline type, a molten carbonate type, and a solid oxide type. The oxidation gas may be any gas at least including oxygen and is not limited to the air.

Insulating layers to be laminated to form a base body are not limited to those made of ceramic materials. For example, the insulating layers may be made of heat-resistance resin. Additionally, insulating layers made of different materials may be laminated. The ceramic material is not limited to alumina ceramics and may be, for example, glass ceramics, zirconia ceramics not including alumina components, or silicon carbide ceramics. In particular, electronic circuits can be readily formed on a base body at an excellent electric property using alumina ceramics and glass ceramics, which is preferable. In addition, alumina ceramics and glass ceramics have an excellent corrosion resistance to fuel, such as methanol and water, can effectively prevent permeation of the fuel, and can effectively prevent interconnecting conductors from corroding due to permeation of the fuel.

The size and shape of grooves (including holes) provided in insulating layers or a flow channel formed by the grooves may be set accordingly. Thus, the grooves do not have to penetrate insulating layers in the thickness direction. A discharging channel does not have to be arranged closer to a surface of a base body relative to a feeding channel. At least part of the discharging channel does not have to be arranged along the feeding channel. The flow direction of liquid in the discharging channel and the flow direction of the liquid in the feeding channel may be the same. In any case, since a flow channel can be formed at a given position inside a base body by forming grooves in unlaminated insulating layers, an improvement in the arrangement flexibility is advantageously provided.

The shape and size of the fuel storage unit can be set accordingly like the flow channel. For example, fuel storage spaces are formed with one insulating layer being left on sides of the first surface S1 and the second surface S2 in the embodiment. However, the number of insulating layers forming the storage spaces or the wall of the storage spaces is set accordingly.

Various kinds of electronic components can be selected as electronic components provided inside a base body or on a surface of the base body and to be driven by electric power fed from a fuel cell. For example, the electronic components may be those necessary for functions of the fuel cell or those offering functions different from the functions of the fuel cell.

The former ones correspond to, for example, the control unit 7, the capacitor 8, and the flow control unit 32 in the embodiment. In addition to those described in the embodiment, for example, temperature sensors may be arranged at a plurality of points inside or on the base body to prevent the fuel cell from being broken because temperature of the base body or the fuel inside the base body becomes high for some reasons and processing, such as stopping generation of electricity, may be executed when temperature equal to or higher than reference temperature is detected. This allows the fuel cell to be used stably for a long time.

In addition, the latter ones correspond to, for example, a speaker including an amplifier that amplifies external signals and converts the signals into audio signals and a volatile recording medium that holds information input through a computer or the like. When a fuel cell has electronic components offering functions different from those of the fuel cell inside or on the base body, the fuel cell of the present invention can be considered as an electronic device including a fuel cell.

In either case, when an electronic component is provided inside or on a base body, modularization and miniaturization are easy since the base body is formed of a multilayer substrate.

A flow control unit and a concentration adjusting unit are not essential to the present invention. Additionally, the flow control unit and the concentration adjusting unit may be provided at any fuel-existing place, such as the feeding channel, the contact portion, the discharging channel, or the fuel storage unit. The flow control unit is not limited to an electroosmotic flow control unit and may be, for example, a flow control unit with a check valve that vibrates a diaphragm to send out liquid. The flow control unit is not limited to those for sending out the fuel. For example, the flow control unit may be, for example, those for sending out oxidation gas or those sending out water to be mixed with the fuel.

FIG. 13(a) to FIG. 13(c) are diagrams showing examples of arrangement positions of flow control units.

In FIG. 13(a), the feeding channel 17a of the fuel flow channel 17 is divided into a plurality of branches for a plurality of cell main bodies 15. A flow control unit 32-1 is provided on the upstream side of the division point. Meanwhile, the division direction (downward direction on the paper) is the thickness direction of a layered substrate as shown in, for example, FIG. 2 or the like.

In addition, in FIG. 13(a), temperature sensors (temperature detecting elements) 79 are provided. The temperature sensor 79 includes, for example, a resistor and a resistance meter for measuring resistance of the resistor (both are not shown). The temperature sensor 79 detects a change in the resistance according to a change in temperature of the resistor, thereby detecting the temperature. The resistor, like the conducting path 18 or like, may be formed by printing metal paste on an unfired ceramic green sheet (the insulating layer 3) or may be constituted by a general-purpose component, such as a thermistor. A suitable number of temperature sensors (resistors) 79 are provided at suitable positions. For example, the temperature sensors 79 are arranged at a position touching the cell main body 15, a position touching the fuel flow channel 17, and on and inside the base body not touching the cell main body 15 nor the fuel flow channel 17. By providing such temperature detecting elements, stable electricity generation can be performed.

A detection signal of the temperature sensor 79 is output to the control unit 7 as in the case of the flow velocity sensor 31 of FIG. 7. The control unit 7 controls operations of the flow control unit 32-1 on the basis of the temperature information from the temperature sensors 79. For example, when the temperature detected by the temperature sensor 79 is higher than a predetermined threshold, the control unit 7 controls operations of the flow control unit 32-1 so that an amount of supplied fuel is reduced or stopped. Alternatively, the control unit 7 holds data that identifies correlation between temperature, an amount of supplied fuel, and an amount of generated electricity of the cell main body 15. The control unit 7 calculates the amount of supplied fuel based on the detected temperature and the amount of electricity currently needed with reference to the data and controls operations of the flow control unit 32-1 so that the calculated amount of fuel is supplied.

In an example of FIG. 13(a), by dividing the feeding channel 17a into a plurality of branches, fuel can be efficiently fed to a plurality of cell main bodies 15. In addition, by commonly providing the flow control unit 32-1 in the plurality of flow channel branches, the number of flow control units 32-1 can be reduced, which can decrease the cost.

Additionally, since the fuel flow is controlled based on the temperature information from the temperature sensor 79, an excessive rise in temperature of a fuel cell can be prevented. In addition, since an amount of generated electricity of the cell main body 15 changes depending on temperature, stable electricity generation can be performed by controlling an amount of supplied fuel according to a temperature change.

In FIG. 13(b), the feeding channel 17a of the fuel flow channel 17 is divided into a plurality of branches for a plurality of cell main bodies 15. A flow control unit 32-2 is provided in each of the plurality of flow channel branches on the downstream side of the division point. Meanwhile, the plurality of flow control units 32-2 may have identical configuration and performance or different configurations and performances. The plurality of flow control units 32-2 may be controlled independently or commonly (at an identical control amount). In addition, the division direction (downward direction on the paper) is the thickness direction of a layered substrate as shown in, for example, FIG. 2 or the like.

Also in FIG. 13(b), a suitable number of temperature sensors 79 (resistors) are provided at suitable positions. For example, the temperature sensors 79 are provided at positions where temperature of each of the plurality of cell main bodies 15 can be detected (positions adjacent to the cell main bodies 15).

In an example of FIG. 13(b), by dividing the feeding channel 17a into a plurality of branches, fuel can be efficiently fed to the plurality of cell main bodies 15. Additionally, by providing the flow control unit 32-2 in each of the plurality of flow channel branches, a suitable amount of fuel can be sent to each flow channel branch. For example, a decrease of fuel sent out to the cell main body 15 located farthest from the flow control unit can be prevented. Since the plurality of cell main bodies 15 are arranged at different positions, an amount of supplied oxidation gas and heat fluxes at the time of heat radiation differ and a suitable amount of supplied fuel also differs. However, with this configuration, the flow control unit can appropriately supply fuel corresponding to the arrangement position. There may be a case where a suitable amount of fuel to be supplied differs for each cell main body 15 because the cell main bodies 15 having different performances may be provided or an electric power supplying destination (electronic component) differs for each of the plurality of cell main bodies 15. However, such a case can also be handled. When the temperature sensor 79 is provided for each of the plurality of cell main bodies 15 and the amount of supplied fuel is controlled for each of the plurality of cell main bodies 15 according to a detection result of each temperature sensor 79, an amount of fuel suitable for the temperature of each cell main body 15 can be supplied.

In FIG. 13(c), the feeding channel 17a of the fuel flow channel 17 is divided into a plurality of branches for one cell main body 15. A flow control unit 32-3 is provided in each of the plurality of flow channel branches on the downstream side of the division point. The plurality of flow channel branches are connected to a plurality of suitable points of the contact portion 17b of the fuel flow channel 17 shown in, for example, FIG. 5 and FIG. 6. In addition, a plurality of discharging channels 17c of the fuel flow channel 17 extends from a plurality of suitable positions of the contact portion 17b and then joins together. Meanwhile, the division direction (downward direction on the paper) is the thickness direction of a layered substrate as shown in, for example, FIG. 2 or the like.

In an example of FIG. 13(*c*), by dividing the feeding channel 17a into a plurality of branches, fuel can be efficiently fed to one cell main body 15. Additionally, by providing the flow control unit 32-3 in each of the plurality of flow channel branches, a suitable amount of fuel can be sent to each flow channel branch.

FIG. 14(*a*) and FIG. 14(*b*) show examples where a vibrator for vibrating walls forming the fuel flow channel 17 is provided as the fuel control unit. The vibrator may be, for example, a piezoelectric element that expands and contracts according to a level of applied voltage.

A flow control unit 32-4 of FIG. 14(*a*) includes a piezoelectric element 81 and a pair of electrodes 82P and 82N (simply referred to as "electrodes 82" without distinction) for applying voltage to the piezoelectric element 81.

The piezoelectric element 81 is, for example, piezoelectric ceramics. The piezoelectric ceramics are formed by polarizing a Pb(Zr, Ti)O$_3$ sintered body or the like. For example, the piezoelectric element 81 has thickness similar to that of one insulating layer 3 and is fitted in a recess formed in one insulating layer.

The electrodes 82P and 82N are arranged to sandwich the piezoelectric element 81 in a direction vertical to the fuel flow channel 17. The electrode 82N faces part of the fuel flow channel 17 formed in parallel to the insulating layers. That is, the piezoelectric element 81 faces the fuel flow channel 17 through the electrode 82N.

A configuration of an electrical system of a fuel cell including the flow control unit 32-4 is similar to that of FIG. 7. However, the electrodes 82 are connected to a power supply unit 9' for the flow control unit (voltage control unit, corresponding to the power supply unit 9 for the flow control unit of FIG. 7). By providing the voltage control unit in this manner, stable fuel supply can be performed and the stability of generation of electricity can be improved. The electrodes 82 and the power supply unit 9' are connected through the conducting path 18. The power supply unit 9' applies voltage to the electrodes 82. The piezoelectric element 81 expands and contracts according to a change in the voltage applied thereto through the electrodes 82, vibrates the electrode 82N, which is part of walls forming the fuel flow channel 17, and apply pressure onto fuel in the fuel flow channel 17.

By setting incoming fuel resistance greater than outgoing fuel resistance, the fuel control unit 32-4 is configured as a valveless flow control unit that prevents backflow toward the fuel incoming side. For example, a cross section of an incurrent channel 83 to be connected to an area facing the piezoelectric element 81 is formed smaller than that of an excurrent channel 84. Accordingly, if pressure applied to fuel by the piezoelectric element 81 increases, turbulences are formed more easily at the incurrent channel 83 than the excurrent channel 84, which increases the fluid resistance. Due to this, an amount of backflow toward the incurrent channel 83 becomes less than an amount of flow to the excurrent channel 84.

The flow control unit 32-4 is formed as follows, for example. First, a hole where the piezoelectric element 81 is embedded is formed in an unfired ceramic green sheet (the insulating layer 3) using laser processing or punching processing. An unfired piezoelectric ceramics (the piezoelectric element 81) is then embedded in the hole and metal paste (the electrodes 82) is disposed on both sides of the piezoelectric ceramics. A plurality of ceramic green sheets having grooves (the fuel flow channel 17, the incurrent channel 83, and the excurrent channel 84) formed therein are then laminated thereon and fired.

Operations of the flow control unit 32-4 are controlled by the control unit 7 as in the case of the flow control unit 32 of FIG. 7. In addition, the flow control unit 32-4 is an example of the flow control units 32-1 to 32-3 of FIG. 13 and is controlled based on detection results of the temperature sensors 79. More specifically, the control unit 7 causes the power supply unit 9' to apply voltage to the electrodes 82 and change the voltage to be applied. For example, the control unit 7 sets a potential at the electrode 82N as reference voltage and alters the potential of the electrode 82P between the reference voltage and voltage higher than the reference voltage. This causes the piezoelectric element 81 to expand and contract, which applies pressure to the fuel. The control unit 7 changes amplitude and frequency of voltage to be applied according to detection results of the temperature sensors 79.

A flow control unit 32-5 of FIG. 14(*b*) includes a piezoelectric element 81 and a pair of electrodes 82 that apply voltage to the piezoelectric element 81 as in the case of the flow control unit 32-4. However, the flow control unit 32-5 has a plurality of combinations of the piezoelectric element 81 and the electrodes 82 along the fuel flow channel 17 and is constituted as a traveling-wave flow control unit. More specifically, the flow control unit 32-5 is constituted as a valveless flow control unit that prevents backflow of fuel by causing the plurality of piezoelectric elements 81 to expand and contract at different timings.

The flow control unit 32-4 of FIG. 14(*a*) and the flow control unit 32-5 offer advantages similar to those of the flow control unit 32 of the embodiment. More specifically, since an amount of generated electricity can be controlled according to various conditions, such as operation states of electronic components inside and outside a fuel cell. Since the flow control unit 32 is provided inside the base body 2 formed by a multiplayer substrate, modularization and miniaturization of a system for controlling an amount of generated electricity through flow control are easy.

In addition, the flow control unit including a vibrator can be made in various manners.

The vibrator has only to be able to vibrate walls forming a fuel flow channel and is not limited to a piezoelectric element (piezoelectric device). That is, an actuator of the vibrator may be constituted of a suitable element. For example, the actuator of the vibrator can be constituted by electrostatic types that utilize electrostatic attraction, electromagnetic types that utilize magnetic force, heat types that utilize thermal expansion of a component, and SMA (Shape Memory Alloy) types that utilize deformation according to a change in temperature of SMA. The walls forming the flow channel may be surfaces of the vibrator.

In addition to piezoelectric ceramics, suitable materials like single crystals such as crystal, LiNbO$_3$, LiTaO$_3$, and KNbO$_3$, thin films such as ZnO and AlN, and piezoelectric polymer films such as polyvinylidene fluoride (PVDF) can be used as the piezoelectric element.

The piezoelectric element may have any structure, monomorph, bimorph, or layered type. In addition, the piezoelectric element may be not only an element that vibrates walls of a fuel flow channel by expansion and contraction but also an element that vibrates the walls by slip.

The thickness of the piezoelectric element does not have to be substantially equal to thickness of one insulating layer and is thicker or thinner than one insulating layer. In addition, an arrangement position of a piezoelectric element does not have to be a position facing part of a fuel flow channel extending in parallel to insulating layers. The piezoelectric element may be arranged to face suitable positions, such as part of the fuel flow channel vertical to insulating layers, a bent part, or a branching part.

Electrodes have only to apply voltage to a piezoelectric element so as to cause the piezoelectric element to vibrate walls forming a fuel flow channel and are not limited to those sandwiching the piezoelectric element in the direction vertical to the fuel flow channel. For example, electrodes may be arranged to sandwich a piezoelectric element in a direction along the fuel flow channel. A flow control unit does not have to be a valveless flow control unit and may be equipped with a check valve.

FIG. 15 to FIG. 22 show preferred examples of an electroosmotic flow control unit. As shown in FIG. 12, in an electroosmotic flow control unit, negatively charged walls of the fuel flow channel 17 attract positive charges in fuel to walls of the fuel flow channel 17. The positive charges are caused to move by the electrodes 36, which causes the fuel to move. Accordingly, it is possible to efficiently attract positive charges in the fuel to walls and move the fuel by increasing an area of walls in contact with the fuel. A specific example in which an area of walls in contact with the fuel is increased is shown below.

A flow control unit 32-11 of FIG. 15 has a pair of electrodes 36-1P and 36-1N (hereinafter, simply referred to as "electrodes 36-1" without distinction) as in the case of the flow control unit 32 of FIG. 7. The flow control unit 32-11 applies voltage to the electrodes 36-1 to cause fuel to flow. In addition, the flow control unit 32-11 includes a linking member 91-1 (hereinafter, "-1" may be omitted and the linking member is not be distinguished from linking members 91-2 and 91-3, which will described later) between the electrodes 36-1.

FIG. 16(a) is a perspective view of the linking member 91-1. FIG. 16(b) is a diagram (plan view) when the linking member 91-1 is viewed in a flow direction of the fuel flow channel 17. FIG. 16(c) is a sectional view in the direction of arrows XVIc-XVIc of FIG. 16(b).

The linking member 91-1 is constituted by a porous material made of, for example, ceramics. A plurality of holes 92 formed therein is three-dimensionally connected, whereby the porous material allows liquid (fuel) to pass therethrough.

Preferably, the porosity of the porous material is set equal to or higher than 20% from the standpoint of reducing fuel pressure loss and increasing the flowability of fuel. In addition, the porosity is preferably set equal to or lower than 80% from the standpoint of efficiently localizing charges of fuel. Thus, preferably, the porosity of the porous material is 20%-80%. More preferably, the porosity of the porous material is 40%-60% from the standpoint of maintaining the strength of a base body at a high level. The porosity can be determined by calculating an average ratio Sr of areas of the holes 92 from a plurality of cross sectional images and calculates the 3/2-th power of the calculated average area ratio Sr. In addition, the average cross section S of the holes 92 calculated based on the cross sectional images is preferably 25-40000 square micrometers, more preferably, 3000-10000 square micrometers.

The linking member 91-1 is formed, for example, in substantially cylindrical shape. As shown in FIG. 15, the height of the cylindrical linking member 91-1 is equivalent to thickness of one insulating layer 3, for example. The linking member 91-1 is held in one of the insulating layers 3 at a point where part of the fuel flow channel 17 penetrates the insulating layers 3. More specifically, parallel grooves provided in different insulating layers 3 are linked to each other by holes penetrating the insulating layers 3 arranged therebetween, thereby the fuel flow channel 17 is constituted. The linking member 91-1 is provided in the holes (connecting portions) linking the grooves.

The electrodes 36-1P and 36-1N are formed, for example, in plate-like shape and are arranged at walls forming the fuel flow channel 17 where end faces of the linking member 91-1 face. That is, the electrodes 36-1P and 36-1N are arranged to be vertical to the fuel flow direction. The electrodes 36-1P and 36-1N have a cross section as large as that of the linking member 91-1, for example.

For example, the flow control unit 32-11 is formed as follows. First, a hole where the linking member 91-1 is embedded is formed in an unfired ceramic green sheet (the insulating layer 3) using laser processing or punching processing. The hole is then filled with ceramic paste having more resin components than the ceramic green sheet. For example, the resin content rate of the ceramic paste is set to 2-10 times of the resin content rate of the ceramic green sheet constituting the base body 2. Ceramic green sheets having metal paste (electrodes 36-1) formed thereon are then laminated on the ceramic green sheet and then laminated sheets are fired. Since the resin component volatilizes, the ceramic paste turns into the porous linking member 91-1. More specifically, the linking member 91-1 is formed by the same material as the insulating layers 3. By forming the linking member 91-1 by the same material as that of the insulating layers 3 constituting the base body 2, the stress caused by the thermal expansion difference can be suppressed and a damage of the linking member 91-1 can be effectively suppressed. In addition, the linking member 91-1 may be formed by embedding a porous material in an unfired ceramic green sheet.

Since the linking member 91-1 arranged in the fuel flow channel 17 is made of a porous material, the surface area of walls in contact with fuel is greater than a case where the linking member 91-1 is not arranged. Thus, localization of charges in the fuel is promoted and the fuel can efficiently flow in the flow control unit 32-11.

Since the linking member 91-1 is formed by the same material as that of the base body 2, a gap due to heat expansion is hardly generated between the base body 2 and the linking member 91-1 and the durability improves.

Since the linking member 91-1 is arranged as part of the fuel flow channel 17 that penetrates the insulating layers 3, the linking member 91-1 can be arranged in a hole provided in the insulating layer 3, which makes formation of the linking member 91-1 easy. In particular, when a material including a resin component is arranged in the insulating layers 3 and is fired to form a porous material, formation of the linking member 91-1 is easy since the hole has to be filled with the material including the resin component.

FIG. 17 shows another example of a linking member. More specifically, FIG. 17(a) is a perspective view. FIG. 17(b) is a diagram viewed in a flow direction of the fuel flow channel 17. FIG. 17(c) is a sectional view in the direction of arrows XVIIc-XVIIc of FIG. 17(b).

The exterior of a linking member 91-2 of FIG. 17 is formed in a manner similar to the linking member 91-1, for example. The linking member 91-2 is arranged at the arrangement position of the linking member 91-1 shown in FIG. 15. A plurality of holes 94 piercing the linking member in the flow direction of the fuel flow channel 17 is provided in the linking member 91-2. The diameter of the hole 94 is preferably equal to or smaller than 50 micrometers from the standpoint of efficient localization of charges in fuel, more preferably 5-30 micrometers from the standpoint of excellent flowability and maintenance of strength of the base body 2 at a high level.

For example, the linking member 91-2 is formed as follows. First, holes, to become the holes 94, are formed at a portion of an unfired ceramic green sheet (the insulating layer 3), to become the linking member 91-2, using laser processing or punching processing. Ceramic green sheets having metal paste (electrodes 36-1) formed thereon are then laminated on the ceramic green sheet and then laminated sheets are fired. More specifically, the linking member 91-2 is made of the same material as that of the insulating layers 3. By forming the linking member 91-2 by the same material as that of the insulating layers 3 constituting the base body 2 in this manner, the stress caused by the thermal expansion difference can be suppressed and a damage of the linking member 91-2 can be effectively suppressed. In addition, the linking member 91-2 may be constituted by embedding a member having the holes 94 formed therein in an unfired ceramic green sheet.

The linking member 91-2 offers advantages similar to those of the linking member 91-1. More specifically, by enlarging an area of walls in contact with fuel, localization of charges in the fuel is promoted and fuel can efficiently flow.

Since the linking member 91-2 is arranged at part of the fuel flow channel 17 penetrating the insulating layers 3, the linking member 91-2 can be constituted by directly forming the holes 94 in the insulating layer. Thus, formation thereof is easy.

FIG. 18 shows another example of a linking member. More specifically, FIG. 18(*a*) is a perspective view. FIG. 18(*b*) is a diagram viewed in a flow direction of the fuel flow channel 17. FIG. 18(*c*) is a cross section in the direction of arrows XVIIIc-XVIIIc of FIG. 18(*c*).

An exterior of a linking member 91-3 of FIG. 18 is formed in a manner similar to the linking member 91-1, for example. The linking member 91-3 is arranged at the arrangement position of the linking member 91-1 shown in FIG. 15. A plurality of slits 96 piercing the linking member in the flow direction of the fuel flow channel 17 is provided in the linking member 91-3. The width (diameter) of the slit 96 is preferably equal to or smaller than 50 micrometers from the standpoint of efficient localization of charges in fuel, more preferably 5-30 micrometers from the standpoint of excellent flowability and maintenance of strength of the base body 2 at a high level. The linking member 91-3 is formed in a manner similar to that of, for example, the linking member 91-2.

The linking member 91-3 offers advantages similar to those of the linking member 91-1 or the linking member 91-2. More specifically, by enlarging an area of walls in contact with fuel to promote localization of charges in the fuel, the fuel can efficiently flow.

FIG. 19 shows an arrangement modification of electrodes of an electroosmotic flow control unit. More specifically, FIG. 19(*a*) is a sectional view, whereas FIG. 19(*b*) is a perspective view.

Electrodes 36-2P and 36-2N (hereinafter, simply referred to as "electrodes 36-2" without distinction) of a flow control unit 32-12 are formed, for example, in cylindrical shape and are arranged on part of walls of the fuel flow channel 17 that penetrates the insulating layers 3 to sandwich the linking member 91. That is, the electrodes 36-2 are arranged along the fuel flow direction. The electrodes 36-2 are formed by, for example, filling a hole formed in an unfired ceramic green sheet (the insulating layer 3) with metal paste, filling a center part of the hole with resin, laminating other ceramic green sheets on the ceramic green sheet, and firing the laminated sheets to volatilize the resin.

FIG. 20 shows an arrangement modification of electrodes of an electroosmotic flow control unit. More specifically, FIG. 20(*a*) is a sectional view, whereas FIG. 20(*b*) is a perspective view.

Electrodes 36-3P and 36-3N (hereinafter, simply referred to as "electrodes 36-3" without distinction) of a flow control unit 32-13 are formed, for example, in plate-like shape similar to the shape of cross section of the linking member 91 (e.g., circular shape) and are arranged at end faces of the linking member 91. A plurality of holes 98 is provided in the electrodes 36-3.

For example, when the linking member 91 is the linking member 91-1 made of a porous member, the holes 98 are formed in suitable shape at suitable positions. When the linking member 91 is the linking member 91-2 having the holes 94 formed therein, the holes 98 are formed at the arrangement positions of the holes 94 in the same size as the holes 94. When the linking member 91 is the linking member 91-3 having the slits 96 formed therein, the holes 98 are formed at the arrangement positions of the slits 96 in the same size and shape as the slits 96. More specifically, fuel can pass through the holes 98 of the electrodes 36-3 and the linking member 91 and can flow through the fuel flow channel 17.

The electrodes 36-3 are formed, for example, by arranging a member, to become the linking member 91, on an unfired ceramic green sheet (the insulating layer 3), providing metal paste on the linking member 91, forming the holes 98 using laser processing or punching processing, laminating other ceramic green sheets on the ceramic green sheet, and firing the laminated sheets. The holes 94 of the linking member 91-2 and the slits 96 of the linking member 91-3 may be formed at the same time as formation of the holes 98 of the electrodes.

Figure 15:
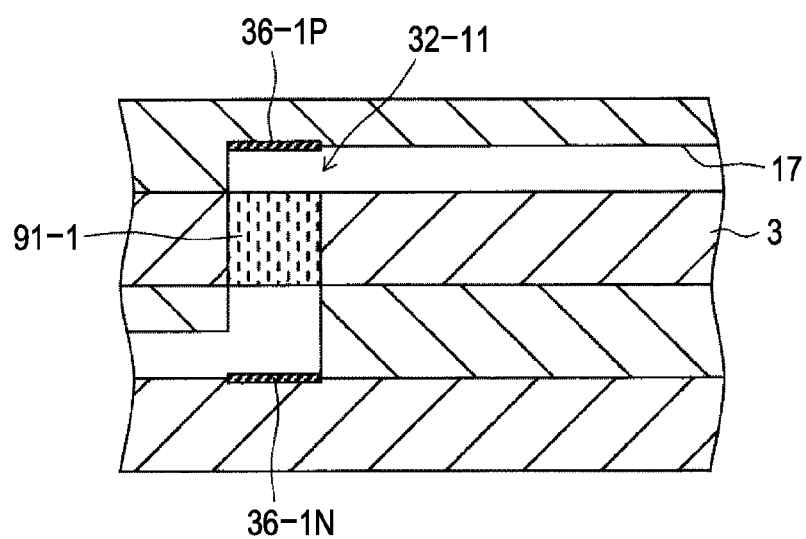
FIG. 15 is a diagram showing an example of an electroosmotic flow control unit.

As shown in FIG. 15, FIG. 19, and FIG. 20, when arranging the linking member 91, a pair of electrodes can be arranged suitably as long as the linking member 91 can be arranged between the electrodes. However, when electrodes are provided on surfaces along the insulating layers 3 as shown in FIG. 15, metal paste has only to be arranged on a surface of an unfired insulating layer 3 and thus formation thereof is easy. When electrodes are provided on surfaces vertical to the insulating layers 3 as shown in FIG. 19, electrodes can be arranged adjacent to the linking member 91 vertical to the insulating layers 3. When electrodes are provided on end faces of the linking member 91 as shown in FIG. 20, formation of the electrodes is easy and the electrodes can be arranged adjacent to the linking member 91.

Figure 21:
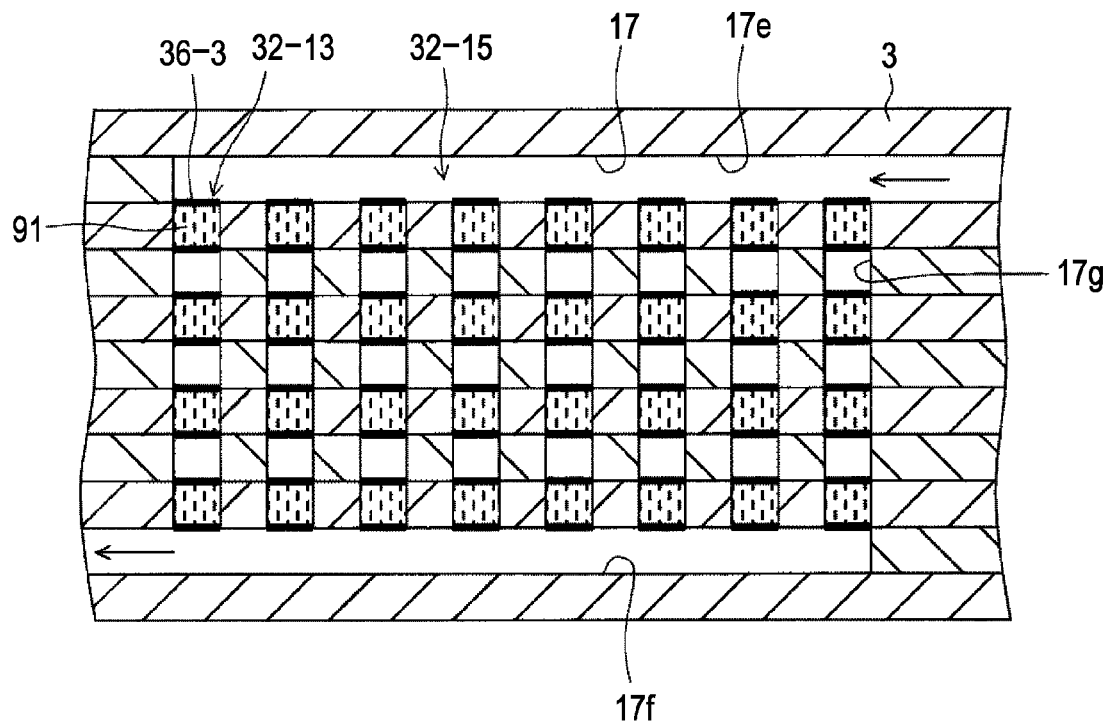
FIG. 21 is a diagram showing a flow control unit array in which electroosmotic flow control units are arranged.

FIG. 21 shows a flow control unit array 32-15 including a plurality of flow control units 32-13, constituted by the linking member 91 and a pair of electrodes 36-3 facing each other and having the linking member 91 therebetween, arranged in series and in parallel.

For example, the fuel flow channel 17 includes a first parallel portion 17*e* that is along the insulating layers 3, a second parallel portion 17*f* apart from the first parallel portion 17*e* by a plurality of layers, and a plurality of penetrating portions 17*g* that connect the first parallel portion 17*e* and the second parallel portion 17*f* and that penetrate a plurality of insulating layers 3. The plurality of penetrating portions 17*g* is adjacent to each other. The flow control units 32-13 are provided at a plurality of positions of the penetrating portions 17*g*. For example, the flow control units 32-13 are provided every other layer. Meanwhile, the number of lines of the flow control units 32-13 in the parallel direction (the number of the penetrating portions 17*g*) is, for example, 100-500, whereas the number of lines of the flow control units 32 in the vertical direction is, for example, 10-20.

The plurality of flow control units constituting the flow control unit array is not limited to the flow control unit 32-3 and may be the flow control unit 32-1 shown in FIG. 15 or the flow control unit 32-2 shown in FIG. 19. A plurality of flow control units is arranged only in series or in parallel. When a plurality of flow control units are arranged in series, the flow control units may be arranged in series along insulating layers or may be linked in a zigzag fashion instead of being linked linearly. In addition, when a plurality of flow control units are arranged in parallel, the flow control units may be arranged in parallel in a direction vertical to insulating layers. The flow control units may be linearly arranged in parallel or arranged in a plane in parallel.

FIG. 22 shows an example where a shielding conductor 231 is provided around an electroosmotic flow control unit. More specifically, FIG. 22(*a*) is a sectional view, whereas FIG. 22(*b*) is a perspective view.

The shielding conductor 231 includes, for example, plate-like conductors 232 formed along the insulating layers 3 and via conductors 233 formed to penetrate the insulating layers 3. Two plate-like conductors 232 are arranged to sandwich the flow control unit 32-1 in the direction vertical to the insulating layers 3 (vertical direction on the paper). A plurality of via conductors 233 extends to connect the two plate-like conductors 232 and is arranged around the linking member 91. An interval between the via conductors 233 is, for example, equal to or shorter than ½ of a wavelength of a target noise, preferably equal to or shorter than ¼. The shielding conductor 231 is connected to the negative terminal 5N through the conducting path (including a conductive layer) 18. More specifically, the shielding conductor 231 is connected to a reference potential (ground).

The plate-like conductor 232 is formed by arranging metal paste on a surface of an unfired ceramic green sheet (insulating layer 3). The via conductor 233 is formed by forming a hole in an unfired ceramic green sheet using laser processing or punching processing, and filling the hole with metal paste.

In an example of FIG. 22, the shielding conductor 231 reduces noises entering an electroosmotic flow control unit and noises released from the electroosmotic flow control unit. Accordingly, a fuel flow control error of the electroosmotic flow control unit is decreased and malfunctions of electronic components provided in a fuel cell and electronic components driven by the fuel cell are prevented.

Since the shielding conductor 231 includes the via conductors 233, it is easy to form the shielding conductor 231 to block noises entering and released in the direction along the insulating layers 3.

Meanwhile, the shielding conductor 231 may be arranged around a flow control unit (vibrator) when the flow control unit is constituted by a vibrator, such as a piezoelectric element.

In addition to the foregoing, an electroosmotic flow control unit may be carried out in various manners.

An electroosmotic flow control unit may be a unit that allows fuel to flow towards a higher-potential side or a lower-potential side. Meanwhile, whether walls in contact with fuel are charged positively or negatively is decided by materials of fuel, walls forming a fuel flow channel, and a linking member.

The linking member has only to be able to attract positive charges or negative charges in fuel by a touch of fuel and is not limited to ceramics. The linking member does not have to be in the same thickness as one insulating layer and may be thinner or thicker than one insulating layer. A cross sectional shape of the linking member may be set accordingly. In addition, an arrangement position of the linking member does not have to be part of the fuel flow channel penetrating the insulating layers. The linking member may be arranged at suitable positions, such as part of the fuel flow channel parallel to insulating layers, a bent part, or a branching part.

The flow control unit may allow fuel to flow in the direction opposite to a basic flow direction. Alternatively, some of the plurality of flow control units may allow fuel to flow in a direction opposite to that of the other flow control units. For example, when the plurality of flow control units 32-4 shown in FIG. 14(*a*) are provided, a cross section of the incurrent channel 83 of some of the flow control units 32-4 may be set larger than that of the excurrent channel 84. The flow control unit 32-5 shown in FIG. 14(*b*) may allow the fuel to flow in opposite direction by the power supply unit 9' changing timings of varying voltage to be applied to the plurality of electrodes 82. The electroosmotic flow control unit shown in FIG. 7 or the like may allow fuel to flow in the opposite direction by the power supply unit 9 switching positive and negative voltages applied to the pair of electrodes. By applying a force that causes fuel to flow in the opposite direction to the fuel, the flow control unit can rapidly reduce or stop the fuel flow and can suitably control an amount of generated electricity and an amount of generated heat.

Electronic components provided in a fuel cell may be arranged at suitable positions of parts (e.g., a fuel flow channel) constituting the fuel cell.

FIG. 23 is a conceptual diagram showing an arrangement example of an electronic component 301 and a fuel flow channel of the base body 2 of a fuel cell in perspective plan view. The direction of perspective plan view is, for example, the thickness direction of the thin rectangular parallelepiped base body 2 of the embodiment or the lamination direction of the base body 2 constituted by laminated insulating layers 3. In addition, the electronic component 301 is, for example, a coil (inductor), a capacitance (capacitor), a resistor, a DC/DC converter (constituting, for example, the power supply unit 6 and the power supply unit 9 for a flow control unit), a filter circuit, or an antenna element.

FIG. 23(*a*) illustrates a case where the electronic component 301 is arranged to overlap the storage spaces 25 of the fuel storage unit 16 in perspective plan view of the base body 2. Since the storage spaces 25 store a relatively large amount of fuel, a temperature change resulting from generation of electricity is dull at the position where the storage spaces 25 are arranged and a local temperature change hardly occurs. Accordingly, the temperature of the electronic component 301 is readily kept uniform and constant. Thus, the performance of the electronic component 301 is stabilized.

When the electronic component 301 is, for example, a coil, a capacitor, or a resistor, a change in inductance, capacitance, or resistance resulting from the temperature change is reduced, which ultimately stabilizes operations of a DC/DC converter and a filter circuit including the coil, capacitor, and resistor. When the electronic component 301 is an antenna element, a change in gain resulting from the temperature change is reduced. In addition, when the temperature of fuel in the fuel storage unit 16 is lower than that of the electronic component 301, heat generated by the electronic component 301 is released to the fuel storage unit 16, whereby overheat of the electronic component 301 can be prevented and temperature of the fuel can be raised to a level suitable for generation of electricity.

Meanwhile, the storage spaces 25 of the fuel storage unit 16 can be considered as part of a fuel flow channel since fuel comes in and out from the spaces. Similarly, an internal space of the cartridge 71 (FIG. 8) inserted into the fuel storage unit 16' can be also considered as part of a fuel flow channel. That is, in FIG. 23(*a*), it can be considered that a flow channel overlapping the electronic component 301 in perspective plan view of the base body 2 forms at least part of a fuel storage unit.

FIG. 23(b) illustrates a case where the electronic component 301 is arranged to overlap the fuel flow channel 17 in perspective plan view of the base body 2. More specifically, the electronic component 301 is arranged to overlap both the feeding channel 17a of the fuel flow channel 17 on the upstream side of the cell main body 15 and the discharging channel 17c on the downstream side of the fuel cell 15. Meanwhile, the electronic component 301 may be arranged to overlap either the feeding channel 17a or the discharging channel 17c. In addition, the electronic component 301 overlaps a plurality of flow channels that are divided from the feeding channel 17a. The electronic component 301 may overlap a plurality of flow channels that are divided from the discharging channel 17c.

Since the electronic component 301 is arranged to overlap the fuel flow channel 17 in perspective plan view of the base body 2, temperature of the electronic component 301 is affected by temperature of fuel flowing through the fuel flow channel 17 when it compared with a case where the electronic component does not overlap. Accordingly, when it is compared with a case where the electronic component 301 does not overlap the fuel flow channel 17 and only operation states of the electronic component 301 and a change in temperature outside the fuel cell affect the temperature of the electronic component 301, an option for adjusting the temperature of the electronic component 301 by the temperature of the fuel in the fuel flow channel 17 is provided and the flexibility in design improves. When an amount of generated electricity is controlled so that the temperature of the fuel becomes constant, keeping the temperature of the electronic component 301, arranged to overlap the fuel flow channel 17, at a constant level becomes easier and a stable performance is obtained. When the temperature of the fuel in the fuel flow channel 17 is lower than that of the electronic component 301, heat generated by the electronic component 301 is released to the fuel, whereby overheat of the electronic component 301 can be prevented and the temperature of the fuel can be raised to a level suitable for generation of electricity.

Since the electronic component 301 is arranged to overlap a plurality of flow channels divided from the fuel flow channel 17, the electronic component 301 overlaps a broader area of the flow channels. Thus, the aforementioned advantages can be obtained more certainly and it is possible to prevent the electronic component 301 from being locally affected by heat of the fuel in the fuel flow channel 17. In addition, temperature in each flow channel branch becomes very similar and heat can be released evenly, which improves the heat-releasing efficiency.

The electric component 301 is arranged to overlap the feeding channel 17a and the temperature of fuel in the feeding channel 17a is lower than that of the fuel in the discharging channel 17c. Thus, when heat is released from the electronic component 301 to the fuel, the electronic component 301 can release the heat to the fuel more efficiently and can raise the temperature of the fuel to a level suitable for generation of electricity. When the temperature of the fuel is higher than that of the electronic component 301, overheat of the electronic component 301 can be more likely to be prevented than a case where the electronic component 301 is arranged to overlap the discharging channel 17c.

Meanwhile, the arrangement position of the electronic component 301 in perspective plan view is not limited to positions shown in FIG. 23(a) and FIG. 23(b) and may be, for example, a position not overlapping the fuel flow channel 17 nor the fuel storage unit 16 or a position overlapping two.

FIG. 24(a) is a sectional view showing an example of a position of the electronic component 301 in the thickness direction of the base body 2 when the electronic component 301 is arranged to overlap the feeding channel 17a and the discharging channel 17c of the fuel flow channel 17 as in the base of FIG. 23(b).

In FIG. 24(a), the electronic component 301 is arranged near the feeding channel 17a among the feeding channel 17a and the discharging channel 17c. The temperature of fuel in the feeding channel 17a is lower than that of fuel in the discharging channel 17c as described before. Thus, when heat is released from the electronic component 301 to the fuel, the electronic component 301 can release the heat to the fuel more efficiently and can raise the temperature of the fuel to a level suitable for generation of electricity. When the temperature of the fuel is higher than that of the electronic component 301, overheat of the electronic component 301 can be more likely to be prevented than a case where the electronic component 301 is arranged near the discharging channel 17c.

Although the feeding channel 17a and the discharging channel 17c are slightly shifted from one another in perspective plan view in FIG. 23, the feeding channel 17a and the discharging channel 17c may be arranged to overlap each other in perspective plan view. In this case, it is possible to uniformize fuel temperature through heat exchange between the feeding channel 17a and the discharging channel 17c and to block heat from the discharging channel 17c released to the electronic component 301 by fuel in the feeding channel 17a absorbing heat of fuel in the discharging channel 17c.

In FIG. 24(a), the electronic component 301 is arranged near the second surface S2 among the first surface S1 and the second surface S2. On the other hand, it is preferable to arrange the second surface S2 of a fuel cell to face outside of a housing of an electronic device, such as a mobile phone, and to arrange the first surface S1 thereof to face inside the housing from the standpoint of readiness of induction of the air and of discharging of generated water. Accordingly, attaching a fuel cell to the electronic device with the second surface S2 facing the outside of the housing improves readiness of induction of the air into a fuel cell and heat-releasing efficiency of the electronic component 301 since the electronic component 301 is arranged to face outside of the housing of the electronic device.

FIG. 24(b) is a sectional view showing another example of a position of the electronic component 301, arranged to overlap the fuel flow channel 17 or the fuel storage unit 16, in the thickness direction of the base body 2.

In FIG. 24(b), the electronic component 301 is arranged relatively near the first surface S1 among the first surface S1 and the second surface S2 of the base body 2. The terminals 5 and an IC 302 are arranged on the first surface S1. Thus, when the electronic component 301 is a DC/DC converter for supplying electric power to the terminals 5 and the IC 302, a distance between the terminals 5 or the IC 302 and the DC/DC converter becomes smaller, which prevents loss of electric power and mixing of noises.

Meanwhile, the arrangement position of the electronic component 301 in the thickness direction of the base body 2 is not limited to positions shown in FIG. 24(a) and FIG. 24(b) and may be, for example, between the feeding channel 17a and the discharging channel 17c or on the first surface S1 and the second surface S2. In addition, combinations of arrangement of the terminals 5 or the IC 302 and arrangement of the feeding channel 17a and the discharging channel 17c may be set accordingly. For example, in FIG. 24(a), the feeding channel 17a and the discharging channel 17c may be arranged near the first surface S1 and the second surface S2, respectively, and the electronic component 301 may be arranged relatively near the first surface S1. In FIG. 24(a), the terminals 5 or the IC 302 may be arranged near the second surface S2. In FIG. 24(b), the feeding channel 17a and the discharging channel 17c may be arranged near the first surface S1 and the second surface S2, respectively.

FIG. 25(a) and FIG. 25(b) show an example of a coil conductor 305 as an example of the electronic component 301. FIG. 25(a) is an exploded perspective view around the coil conductor 305. FIG. 25(b) is a sectional view around the coil conductor 305. The coil conductor 305 constitutes, for example, part of a DC/DC converter and an LC filter.

The coil conductor 305 is arranged in the same size and at the same position as those of a rectangular representing the electronic component 301 in FIG. 23 and FIG. 24. That is, a description of an arrangement example of the coil conductor 305 is the same as the description of the arrangement example of the electronic component 301 and the description is omitted.

The coil conductor 305 is formed by, for example, a spiral conductive layer and is sandwiched by magnetic ferrite layers 306 and 307 having high permeability. Furthermore, the coil conductor 305 and the magnetic ferrite layers 306 and 307 are sandwiched by nonmagnetic ferrite layers 308 and 309. A layered body 310 having the coil conductor 305, the magnetic ferrite layers 306 and 307, and the nonmagnetic ferrite layers 308 and 309 is formed in thickness of one insulating layer 3, for example. The layered body 310 is inserted into a hole formed in one insulating layer 3 and is embedded in a base body constituted by a layered body of the insulating layers 3.

Meanwhile, in the present invention, a magnetic material, such as a magnetic ferrite, means a highly permeable material having a specific permeability equal to or higher than 100, preferably equal to or higher than 500 at a frequency of 100 kHz-10 MHz. In addition, a nonmagnetic material, such as a nonmagnetic ferrite, means a material having a specific permeability equal to or lower than 1.1, preferably equal to or lower than 1.05 at a frequency of 100 kHz-10 MHz.

The coil conductor 305 is connected to a conductive layer, not shown, formed on the magnetic ferrite layer 308 or a conducting path constituted by a conductive layer or a via conductor formed on the insulating layer 3 through a via conductor. The coil conductor 305 is supplied with electric power from the cell main body 15.

The magnetic ferrite layers 306 and 307 and the nonmagnetic ferrite layers 308 and 309 constitute part of the base body of the fuel cell. It can be considered that the coil conductor 305 is constituted by part of interconnecting conductors formed in the base body.

For example, the coil conductor 305 has at least one of metals of Cu, Ag, Au, Pt, Al, Ag—Pd alloy, and Ag—Pt alloy as a main component. The magnetic ferrite layers 306 and 307 are made of, for example, $Fe_2O_3$, CuO, NiO, and ZnO. The nonmagnetic ferrite layers 308 and 309 are made of, for example, $Fe_2O_3$, CuO, and ZnO.

The layered body 310 including the coil conductor 305 is formed as follows, for example. First, conductive paste, to become the coil conductor 305, is printed on a ferrite green sheet, to become the magnetic ferrite layer 306. The ferrite green sheet and ferrite green sheets, to become the magnetic ferrite layer 307 and the nonmagnetic ferrite layers 308 and 309, are laminated. The layered body of the ferrite green sheets is then embedded in a hole formed in a ceramic green sheet, to become the insulating layer 3. The ceramic green sheet and ceramic green sheets, to become other insulating layers 3, are laminated and fired. The coil conductor 305 and the magnetic ferrite layer 307 are fixed together through the firing and the coil conductor 305 is built in the base body.

Since the coil conductor 305, namely, an inductor, is provided in the base body 2 holding a fuel cell as shown in FIG. 25(a) and FIG. 25(b), the fuel cell offers multiple functions. For example, when the inductor constitutes a DC/DC converter, generated electric power can be supplied to an electronic device, to which the fuel cell is attached, after converting voltage of the electric power into suitable voltage. The electric power having voltage suitable for electronic components (e.g., a temperature sensor) provided in the fuel cell can also be supplied to the electronic component as described in FIG. 7 or the like. When the inductor constitutes a filter circuit, such as an LC filter circuit, accuracy of operations of the fuel cell can be increased by removing noises from electric signals and the electric power input or output to and from various electronic components (e.g., a temperature sensor and a high frequency element).

Since the coil conductor 305 is constituted by part of interconnecting conductors formed in the base body, the fuel cell is miniaturized relative to a case where a chip coil is provided in the fuel cell. In addition, since the coil conductor 305 is fixed to and built in the base body, further miniaturization is promoted and disconnection is prevented. Firing of the coil conductor 305 and the magnetic ferrite layer 306 at the same time can make production simpler.

Since the coil conductor 305 is arranged in contact with a magnetic body, miniaturization and thinning of the coil conductor 305 can be promoted while obtaining a predetermined level of inductance. The use of ferrite as a magnetic body can provide the strength suitable for part of a base body and can enable simultaneous firing of the coil conductor 305 and the insulating layers 3 made of ceramics.

FIG. 25(c) shows another arrangement example of the coil conductor 305. In FIG. 25(c), the coil conductor 305 is sandwiched by the insulating layers constituting a whole base body. The insulating layers 3 may be a nonmagnetic material, such as ceramic, or a magnetic material, such as magnetic ferrite.

An inductor provided in a fuel cell is not limited to that illustrated in FIG. 25 and may be configured variously.

For example, the inductor is not limited to an inductor formed by interconnecting conductors formed in a base body of a fuel cell and may be, for example, a chip inductor. The coil conductor is not limited to a coil formed by a conductive layer and may be configured three-dimensionally to include via conductors or the like and have the thickness equal to or thicker than one insulating layer, for example. A plurality of spiral conductive layers may be linked to each other through via conductors or the like in the thickness direction of the insulating layers or in the direction along the insulating layers. When the coil conductor touches the magnetic ferrite, the nonmagnetic ferrite layers 308 and 309 sandwiching the magnetic ferrites may be omitted. When a coil forming layer (e.g., the magnetic ferrite layer 306) having the coil conductor formed thereon is built in a hole of insulating layers constituting the base body, the thickness of the coil forming layer may be set suitably for the thickness of the insulating layer and may be, for example, the thickness of a plurality of insulating layers.

FIG. 26 is a sectional view showing a capacitor as an example of the electronic component 301. The capacitor constitutes part of a DC/DC converter and an LC filter circuit, for example. The capacitor may also constitute the capacitor 8 of FIG. 7.

In an example of FIG. 26(a), a capacitor 315 includes a pair of electrodes 316 and 317 arranged to sandwich the insulating layer 3. The electrodes 316 and 317 are composed of conductive layers formed on the insulating layer 3. That is, the electrodes are constituted by part of interconnecting conductors formed in a base body of a fuel cell. The insulating layer 3 between the electrodes 316 and 317 functions as a dielectric.

In an example of FIG. 26(b), a dielectric 318 of a material different from that of the insulating layer 3 is arranged between the electrodes 316 and 317. The dielectric 318 has the thickness of one insulating layer 3, for example, and is embedded in a hole formed in the insulating layer 3. The dielectric 318 is made of, for example, barium titanate or barium titanate.

Meanwhile, the capacitors 315 and 315' are arranged in the same size and the same position as rectangle representing electronic component 301 in FIG. 23 and FIG. 24, for example. More specifically, a description of an arrangement example of the capacitors 315 and 315' is the same as the description of the arrangement example of the electronic component 301 and the description is therefore omitted. The capacitors 315 and 315' are supplied with electric power from the cell main body 15 through the conducting path 18.

The capacitor 315 shown in FIG. 26(a) are formed by printing conductive paste, to become the electrodes 316 and 317, on, for example, a ceramic green sheet, to become the insulating layer 3, and laminating and firing the plurality of insulating layers 3. The capacitor 315' shown in FIG. 26(a) is also formed in similar manner. However, in the capacitor 315', the dielectric 318 is embedded in the hole provided in a ceramic green sheet before firing the ceramic green sheets. In the capacitor 315', conductive paste, to become the electrodes 316 and 317, may be printed on a material to become the dielectric 318, and may be then fired.

As shown in FIG. 26(a) and FIG. 26(b), since the capacitors 315 and 315', namely capacitance, are provided in the base body 2 holding a fuel cell, the fuel cell offers multiples functions.

Since the capacitors 315 and 315' are constituted by part of interconnecting conductors formed in a base body, miniaturization is promoted compared to a case where a chip capacitor is provided in the fuel cell. In addition, since the capacitors 315 and 315' are fixed to and built in the base body, further miniaturization is promoted. Additionally, firing of the capacitors and the insulating layers 3 at the same time can make production simpler.

Various electronic circuits, such as a DC/DC converter or a filter circuit including electric elements, such as an inductor, a capacitor, a resistor, may be configured in every known manner as the electronic component 301. For example, the DC/DC converter may be configured as an insulation type, a non-insulation type, a self-commutated type, an external commutated type, a down-converting type, an up-converting type, an inverting type, or a flyback type. The filter circuit may be constituted as a low-pass filter, a high-pass filter, a band-pass filter, a band-elimination filter, an LC filter, an electro-mechanical filter, an active RC filter, a mechanical filter, a crystal filter, or a piezoelectric ceramic filter.

A capacitor provided in a fuel cell is not limited to those illustrated in FIG. 26 and may be configured variously.

For example, the capacitor is not limited to those formed by interconnecting conductors formed in a base body of a fuel cell and may be, for example, a chip capacitor. Electrodes are not limited to those formed by conductive layers and may be configured three-dimensionally to include via conductors and have the thickness of one or more insulating layers, for example. A plurality of capacitors may be linked to each other through via conductors or the like in the thickness direction of the insulating layers or in the direction along the insulating layers. The thickness between the electrodes may be thinner or thicker than the thickness of one insulating layer.

Figure 27:
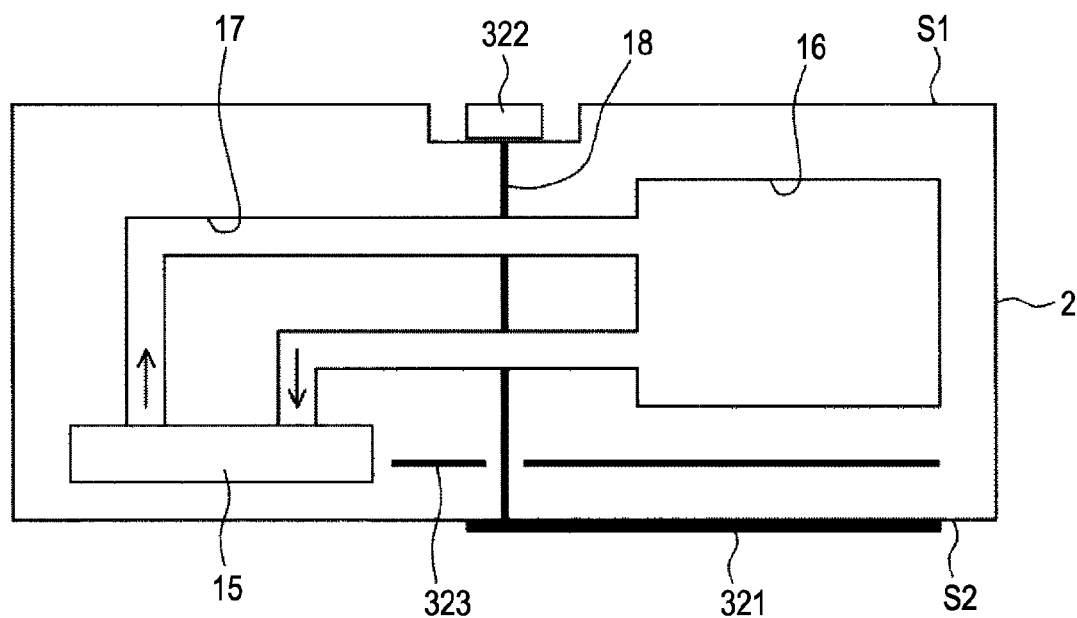
FIG. 27 is a diagram showing an example of an antenna element, which is one example of an electronic component.

FIG. 27 is a sectional view showing an antenna element 321 as an example of the electronic element 301.

The antenna element 321 is arranged in the same size and the same position as those of a rectangle representing the electronic component 301 in FIG. 23 and FIG. 24, for example. More specifically, a description of an arrangement example of the antenna element 321 is the same as the description of the arrangement example of the electronic component 301 and, therefore, the description is omitted. However, FIG. 27 illustrates a case where the antenna element 321 is formed on the second surface S2 of the base body 2 and extends from the fuel storage unit 16 to the fuel flow channel 17.

The antenna element 321 is constituted by forming a suitable pattern of conductive layer on the second surface S2. That is, the antenna element 321 is constituted by part of interconnecting conductors formed in the base body. The antenna element 321 is electrically connected to a high frequency element 322 through the conducting path 18. The high frequency element 322 is constituted by, for example, an IC.

A shielding layer 323 is formed on the inner side of the antenna element 321 in the base body 2. The shielding layer 232 separates the antenna element 321 from other electronic components arranged near the first surface S1. The conducting path 18 connecting the antenna element 321 and the high frequency element 322 pass through a hole formed in the shielding layer 323. For example, one or more insulating layers 3 exist between the antenna element 321 and the shielding layer 323. An antenna characteristic may be appropriately adjusted by setting a dielectric constant of some of or all of the layers between the antenna element 321 and the shielding layer 323 different from that of other insulating layers 3. The antenna element 321 and the high frequency element 322 may be electrically connected via electromagnetic coupling instead of the conducting path 18.

The antenna element 321 may have an appropriate shape, such as a patch antenna, a loop antenna, a slot antenna, a dipole antenna, a monopole antenna, a meander antenna, a helical antenna, and a spiral antenna.

The antenna element 321 or the like shown in FIG. 27 may be formed by printing conductive paste, to become the antenna element 321 and the shielding layer 323, on, for example, a ceramic green sheet, to become the insulating layer 3, and laminating and firing the plurality of insulating layers 3.

Suitable information can be transmitted from the antenna element 321 and received by the antenna element 321. The information may be related to or may not be related to functions of a fuel cell.

For example, information of detection results of various sensors, such as an amount of generated electricity, fuel temperature, and fuel concentration and information obtained by processing the detection result information may be transmitted from the antenna element 321 as information indicating operation states of a fuel cell. In this case, another device receives information indicating the operation states of the fuel cell, whereby the fuel cell can be managed while monitoring the operation states of the fuel cell.

In addition, target values on an amount of generated electricity, fuel temperature, and fuel concentration transmitted from another device as information defining operation states of a fuel cell is received by the antenna element 321. A control unit of the fuel cell may control operations of a flow control unit based on the received target values. In this case, setting for controlling operations of a fuel cell can be changed readily.

When electronic components (e.g., a small security camera) offering functions different from those of a fuel cell are provided in the fuel cell, information obtained through the electronic components (e.g., video information) may be transmitted.

As described above, since the antenna element 321 is provided in the base body 2 holding a fuel cell, the fuel cell offers multiple functions.

Since the antenna element 321 is constituted by part of interconnecting conductors formed in the base body 2, the fuel cell is miniaturized relative to a case where an external antenna is provided in the fuel cell. In addition, since the antenna element 321 is fixed to and built in the base body 2, further miniaturization is promoted and disconnection is prevented. Firing of the antenna element 321 and the insulating layers 3 at the same time can make production simpler.

Meanwhile, FIG. 25 to FIG. 27 illustrate cases where interconnecting conductors formed in a base body constitute a coil conductor, electrodes of a capacitor, or an antenna element. However, the interconnecting conductors have only to be embedded in a base body or a conductive layer laminated on the surface of the base body and is not limited to those fixed to and built in the base body by simultaneously firing the conductors and the base body. For example, the interconnecting conductors may be those inserted into and built in a hole of the base body after firing of the base body.

When a cell main body is located on one side of a base body, an inductor and an antenna are preferably located on the other side of the base body. This can make heat from the cell main body unlikely to conduct to the inductor and the antenna and can maintain the antenna characteristic preferably.

A flow channel is preferably arranged between a cell main body and an inductor or between the cell main body and an antenna. This can effectively suppress, with the flow channel, conduction of heat from the cell main body to the inductor or the antenna and can stabilize characteristics of the inductor and the antenna.

When an amount of generated electricity is controlled according to operation states of electronic devices, methods therefor are not limited to controlling an amount of fuel as long as the amount of generated electricity can be controlled at the end. For example, an amount of oxygen to be fed to an electrolyte member may be controlled. In this case, for example, the amount of oxygen may be controlled with an electromagnetic valve or a flow control unit provided in an air flow channel.

In addition, a reaction control unit for controlling an amount of generated electricity may be provided in a fuel cell or a main body of an electronic device to be connected to the fuel cell. Additionally, when a control unit of a fuel cell and a control unit of an electronic device main body constitute the reaction control unit, roles are assigned to both units appropriately. For example, the control unit of the electronic device main body may output not only necessary electric power but also a calculated fuel flow rate corresponding to the electric power to the control unit of the fuel cell. However, when processing based on characteristics of the electronic device main body, such as calculation of necessary electric power, is assigned to the control unit of the electronic device main body and processing based on characteristics of the fuel cell, such as calculation of a flow rate corresponding to the necessary electric power, is assigned to the control unit of the fuel cell, the compatibility of the fuel cell increases. In addition, a display unit and an operation unit may be provided in a fuel cell.

It is needless to say that the present invention is not limited to the foregoing embodiments. It is therefore understood that numerous modifications and variations can be devised by those skilled in the art without departing from the scope of the appended claims. Accordingly, such modifications and variations are, unless they depart from the scope of the present invention as delivered from the claims appended hereto, to be construed as included therein.

The invention claimed is:

1. A fuel cell comprising:
   a base body including a laminated body of a plurality of insulating layers with grooves;
   a flow channel linking grooves of the different insulating layers; and
   an electrolyte member contacting with a portion of the flow channel; and
   an antenna on the base body,
   wherein the antenna overlaps the flow channel in perspective plan view of the base body.

2. The fuel cell according to claim 1,
   wherein the electrolyte member is sandwiched between the insulating layers.

3. The fuel cell according claim 1,
   wherein the base body includes a ceramic material.

4. The fuel cell according to claim 1,
   wherein the flow channel includes a circulation channel inside the base body.

5. The fuel cell according to claim 1,
   wherein the flow channel branches off into a plurality of channels at the portion of the flow channel contacting with the electrolyte member.

6. The fuel cell according to claim 1,
   wherein the grooves penetrate insulating layers in the thickness direction.

7. The fuel cell according to claim 1, further comprising:
   an output terminal on a surface of the base body outputting electric power; and
   a conducting path in the base body electrically connecting the output terminal with the electrolyte member.

8. The fuel cell according to claim 1, the flow channel comprising:
   a feeding channel located upstream of the portion of the flow channel contacting with the electrolyte member relative to the direction of fuel flow; and
   a discharging channel located downstream of the portion of the flow channel contacting with the electrolyte member relative to the direction of fuel flow,
   wherein the discharging channel is located closer to a surface of the base body than the feeding channel.

9. The fuel cell according to claim 1, the flow channel comprising:
   a feeding channel located upstream of the portion of the flow channel contacting with the electrolyte member relative to direction of fuel flow; and
   a discharging channel located downstream of the portion of the flow channel contacting with the electrolyte member relative to direction of fuel flow,
   wherein at least the discharging channel is arranged along the feeding channel.

10. The fuel cell according to claim 9,
    wherein the direction of fuel flow through the discharging channel arranged along the feeding channel is opposite to the direction of fuel flow through the feeding channel.

11. The fuel cell according to claim 4,
further comprising a concentration adjusting unit adjusting the concentration of fuel flowing through the circulation channel.

12. The fuel cell according to claim 7,
wherein the output terminal electrically connected to the electrolyte member is placed on a surface of the base body and the electrolyte member is placed closely to the other surface of the base body.

13. The fuel cell according to claim 1,
wherein the antenna is a part of interconnecting conductors formed in the base body.

14. The fuel cell according to claim 1,
wherein the flow channel arranged to overlap the antenna in perspective plan view of the base body is on the upstream side and the downstream side of the electrolyte member and the length between the upstream-side flow channel and the antenna is shorter than the length between the downstream-side flow channel and the antenna.

15. The fuel cell according to claim 14,
wherein the flow channel overlapping the antenna in perspective plan view of the base body constitutes at least part of a fuel storage unit for storing fuel.

16. An electronic device comprising:
a housing;
an operation unit and a display unit on a housing;
an operation control unit controlling display content of the display unit based on input information from the operation unit; and
cell according to claim 1 contained in the housing and supplying electric power to the operation unit, the display unit, and the operation control unit.

17. An electronic device according claim 16, further comprising a reaction control unit controlling the supply of fuel or oxidation gas to the electrolyte member of the fuel cell in accordance with operation states of at least one of the display unit, the operation unit and operation control unit.

18. A fuel cell comprising:
a base body including a laminated body of a plurality of insulating layers with grooves;
a flow channel linking grooves of the different insulating layers;
an electrolyte member contacting with a portion of the flow channel; and
an antenna on the base body,
wherein the antenna is a part of interconnecting conductors formed in the base body.

19. A fuel cell comprising:
a base body including a laminated body of a plurality of insulating layers with grooves;
a flow channel linking grooves of the different insulating layers;
an electrolyte member contacting with a portion of the flow channel; and
an antenna on the base body,
wherein the antenna overlaps the flow channel in perspective plan view of the base body, the flow channel arranged to overlap the antenna in perspective plan view of the base body is on the upstream side and the downstream side of the electrolyte member and the length between the upstream-side flow channel and the antenna is shorter than the length between the downstream-side flow channel and the antenna, and the flow channel overlapping the antenna in perspective plan view of the base body constitutes at least part of a fuel storage unit for storing fuel.

* * * * *